US012438733B2

United States Patent
Elemenshawy et al.

(10) Patent No.: US 12,438,733 B2
(45) Date of Patent: Oct. 7, 2025

(54) AUTHORIZING REQUESTS FOR ACCESS CREDENTIALS, FOR ACCESSING CLOUD RESOURCES, BASED ON SUCCESSFUL STATELESS VALIDATION OF DIGITAL CERTIFICATES

(71) Applicant: Oracle International Corporation, Redwood Shores, CA (US)

(72) Inventors: Ayman M. Elemenshawy, Bellevue, WA (US); Jakub Wojciak, North Vancouver (CA); Kenneth C. Kil, Bellevue, WA (US); Kanish Panwar, Sammamish, WA (US)

(73) Assignee: Oracle International Corporation, Redwood Shores, CA (US)

( * ) Notice: Subject to any disclaimer, the term of this patent is extended or adjusted under 35 U.S.C. 154(b) by 103 days.

(21) Appl. No.: 18/494,089

(22) Filed: Oct. 25, 2023

(65) Prior Publication Data
US 2025/0141696 A1 May 1, 2025

(51) Int. Cl.
*H04L 9/32* (2006.01)
*H04L 9/30* (2006.01)

(52) U.S. Cl.
CPC .............. *H04L 9/3263* (2013.01); *H04L 9/30* (2013.01); *H04L 9/3247* (2013.01)

(58) Field of Classification Search
CPC ....... H04L 9/3263; H04L 9/30; H04L 9/3247; H04L 9/3273; H04L 9/3236; H04L 9/32; H04L 9/3277
See application file for complete search history.

(56) References Cited

U.S. PATENT DOCUMENTS 5,671,279 A  9/1997  Elgamal
5,699,431 A  12/1997  Van Oorschot et al.
(Continued)

FOREIGN PATENT DOCUMENTS

CN  112019477 A  12/2020
CN  114884963 A  8/2022
(Continued)

OTHER PUBLICATIONS

"What is Certificate Lifecycle Management", Retrieved from https://www.encryptionconsulting.com/different-phases-of-a-certificate-lifecycle-management-process/, Aug. 1, 2024, pp. 1-12.
(Continued)

*Primary Examiner* — Michael Won
(74) *Attorney, Agent, or Firm* — Invoke

(57) ABSTRACT

Operations of a system may include executing a provisioning process that includes provisioning a network entity with a digital certificate for use in a stateless validation protocol. After provisioning the network entity with the digital certificate, the system may include receive a credential request from the network entity that includes the digital certificate and a request for an access credential for accessing a cloud resource. In response to the credential request, the system may execute an access-authorization process with respect to the network entity, including authenticating the digital certificate in accordance with the stateless validation protocol. Upon determining that the network entity authorized to receive an access credential, the system may provision the network entity with the access credential. The network entity may then use the access credential to access the cloud resource.

29 Claims, 11 Drawing Sheets

(56) References Cited

U.S. PATENT DOCUMENTS

| | | | |
|---|---|---|---|
| 7,272,714 | B2 | 9/2007 | Nagaratnam et al. |
| 7,644,270 | B1 | 1/2010 | Cherukumudi et al. |
| 8,176,328 | B2 | 5/2012 | Chen et al. |
| 8,452,958 | B2 | 5/2013 | Sun et al. |
| 9,172,543 | B2 | 10/2015 | Wnuk |
| 9,197,630 | B2 | 11/2015 | Sharif et al. |
| 9,231,933 | B1 | 1/2016 | Shenoy et al. |
| 9,485,101 | B2 | 11/2016 | Bowen |
| 9,660,978 | B1 * | 5/2017 | Truskovsky ........ H04L 63/0823 |
| 9,680,813 | B2 | 6/2017 | Sade et al. |
| 9,794,249 | B1 | 10/2017 | Truskovsky et al. |
| 9,882,727 | B1 | 1/2018 | Veladanda et al. |
| 10,021,084 | B2 | 7/2018 | Matthews et al. |
| 10,212,147 | B2 | 2/2019 | Buendgen et al. |
| 10,621,577 | B2 | 4/2020 | Castinado et al. |
| 10,652,030 | B1 | 5/2020 | Levy et al. |
| 10,764,263 | B2 | 9/2020 | Rossi |
| 10,771,261 | B1 | 9/2020 | Lazar et al. |
| 10,812,276 | B2 | 10/2020 | Bojjireddy et al. |
| 10,848,323 | B2 | 11/2020 | Barr, III et al. |
| 11,153,103 | B2 | 10/2021 | Fynaardt et al. |
| 11,196,570 | B2 * | 12/2021 | Borne-Pons ............... H04L 9/30 |
| 11,310,059 | B2 * | 4/2022 | Leibmann ............. H04L 9/0894 |
| 11,362,843 | B1 | 6/2022 | Jiang et al. |
| 11,368,314 | B2 | 6/2022 | Ray et al. |
| 11,388,594 | B2 | 7/2022 | Uy et al. |
| 11,438,325 | B2 | 9/2022 | Begun et al. |
| 11,627,123 | B2 * | 4/2023 | Stayskal ............. H04L 63/0442 726/7 |
| 11,706,038 | B1 | 7/2023 | Thakore et al. |
| 11,888,997 | B1 | 1/2024 | Bowen et al. |
| 12,088,738 | B2 | 9/2024 | Rosenthol et al. |
| 2002/0007346 | A1 | 1/2002 | Qiu et al. |
| 2002/0174066 | A1 * | 11/2002 | Kleckner ............... G06Q 20/10 705/39 |
| 2003/0037234 | A1 | 2/2003 | Fu et al. |
| 2006/0047965 | A1 | 3/2006 | Thayer |
| 2006/0101510 | A1 | 5/2006 | Kadyk et al. |
| 2007/0005956 | A1 | 1/2007 | Zilinskas et al. |
| 2007/0016782 | A1 | 1/2007 | Crall et al. |
| 2007/0147619 | A1 | 6/2007 | Bellows et al. |
| 2010/0030897 | A1 | 2/2010 | Stradling |
| 2010/0325429 | A1 | 12/2010 | Saha et al. |
| 2011/0113239 | A1 | 5/2011 | Fu et al. |
| 2012/0036220 | A1 | 2/2012 | Dare et al. |
| 2012/0240192 | A1 | 9/2012 | Orazi et al. |
| 2012/0246466 | A1 | 9/2012 | Salvarani et al. |
| 2012/0278614 | A1 | 11/2012 | Choi |
| 2013/0086642 | A1 | 4/2013 | Resch et al. |
| 2014/0298419 | A1 | 10/2014 | Boubez et al. |
| 2015/0135299 | A1 | 5/2015 | Liang et al. |
| 2015/0215308 | A1 | 7/2015 | Manolov et al. |
| 2015/0279132 | A1 | 10/2015 | Perotti |
| 2016/0277923 | A1 | 9/2016 | Steffey et al. |
| 2017/0039373 | A1 | 2/2017 | Sasin et al. |
| 2017/0126667 | A1 | 5/2017 | Bishop et al. |
| 2017/0171191 | A1 | 6/2017 | Cignetti et al. |
| 2017/0279807 | A1 | 9/2017 | Jos |
| 2017/0317837 | A1 | 11/2017 | Alrawais et al. |
| 2017/0338967 | A1 | 11/2017 | Lewison et al. |
| 2018/0083966 | A1 | 3/2018 | Zhou et al. |
| 2018/0102904 | A1 | 4/2018 | Lin et al. |
| 2018/0287804 | A1 | 10/2018 | Geisbush |
| 2019/0026804 | A1 | 1/2019 | Yin |
| 2019/0149342 | A1 | 5/2019 | Fynaardt et al. |
| 2019/0165950 | A1 | 5/2019 | Ibrahim |
| 2019/0166635 | A1 | 5/2019 | Mccolgan et al. |
| 2019/0347406 | A1 | 11/2019 | Lev-Ran et al. |
| 2019/0349402 | A1 | 11/2019 | Shukla et al. |
| 2019/0356817 | A1 | 11/2019 | Bush et al. |
| 2019/0363895 | A1 | 11/2019 | Barr et al. |
| 2019/0372783 | A1 | 12/2019 | Martinez et al. |
| 2020/0021575 | A1 | 1/2020 | Rezvani et al. |
| 2020/0092095 | A1 | 3/2020 | Yang et al. |
| 2020/0150972 | A1 | 5/2020 | Ketkar et al. |
| 2020/0274718 | A1 | 8/2020 | Hwang et al. |
| 2020/0274862 | A1 | 8/2020 | Varvarezis et al. |
| 2020/0396089 | A1 | 12/2020 | Guo et al. |
| 2021/0034767 | A1 | 2/2021 | Free et al. |
| 2021/0126801 | A1 | 4/2021 | Nix |
| 2021/0152547 | A1 | 5/2021 | Barhudarian et al. |
| 2021/0211307 | A1 | 7/2021 | Statia et al. |
| 2021/0218723 | A1 | 7/2021 | Lekov et al. |
| 2021/0392002 | A1 | 12/2021 | Gray et al. |
| 2021/0409403 | A1 | 12/2021 | Lewin et al. |
| 2021/0409409 | A1 | 12/2021 | Palanisamy |
| 2022/0014522 | A1 | 1/2022 | Thomas et al. |
| 2022/0038894 | A1 | 2/2022 | Yoon et al. |
| 2022/0123951 | A1 | 4/2022 | Lutz et al. |
| 2022/0150238 | A1 | 5/2022 | Bhalerao |
| 2022/0239503 | A1 | 7/2022 | Mallikarjuna et al. |
| 2022/0393886 | A1 | 12/2022 | Williams et al. |
| 2023/0007474 | A1 | 1/2023 | Ni et al. |
| 2023/0032867 | A1 | 2/2023 | Peddada et al. |
| 2023/0062888 | A1 | 3/2023 | Colombano |
| 2023/0109231 | A1 | 4/2023 | Adogla et al. |
| 2023/0121514 | A1 | 4/2023 | Smith |
| 2023/0208655 | A1 | 6/2023 | Statia et al. |
| 2023/0237155 | A1 | 7/2023 | Jacquin et al. |
| 2023/0291574 | A1 | 9/2023 | Held et al. |
| 2023/0291577 | A1 | 9/2023 | Thai et al. |
| 2023/0401307 | A1 | 12/2023 | Pop et al. |
| 2023/0412397 | A1 | 12/2023 | Gollent et al. |
| 2024/0015508 | A1 | 1/2024 | Yoon et al. |
| 2024/0020373 | A1 | 1/2024 | Ivanov et al. |
| 2024/0031146 | A1 * | 1/2024 | Marosi-Bauer ....... H04L 9/0894 |
| 2024/0106886 | A1 | 3/2024 | Roy et al. |
| 2024/0121603 | A1 | 4/2024 | Yoon et al. |
| 2024/0146543 | A1 | 5/2024 | Sahoo et al. |
| 2024/0333640 | A1 | 10/2024 | Shevade et al. |
| 2024/0356763 | A1 | 10/2024 | Goldberg et al. |
| 2024/0388510 | A1 | 11/2024 | Madtha et al. |
| 2025/0030561 | A1 | 1/2025 | Long et al. |
| 2025/0088373 | A1 | 3/2025 | Uzun et al. |
| 2025/0097211 | A1 | 3/2025 | Uzun et al. |
| 2025/0133401 | A1 | 4/2025 | Lee et al. |

FOREIGN PATENT DOCUMENTS

| | | | |
|---|---|---|---|
| EP | 1251670 | A2 | 10/2002 |
| EP | 2267970 | A2 | 12/2010 |
| EP | 2854349 | A1 | 4/2015 |
| EP | 3772208 | B1 | 9/2024 |
| KR | 10-2011-0045459 | A | 5/2011 |
| WO | 2006/122024 | A2 | 11/2006 |
| WO | 2022/121461 | A1 | 6/2022 |
| WO | 2022/133026 | A1 | 6/2022 |
| WO | 2023/240360 | A1 | 12/2023 |
| WO | 2025/059187 | A1 | 3/2025 |

OTHER PUBLICATIONS

"About Azure Key Vault certificates", Retrieved from https://learn.microsoft.com/en-us/azure/key-vault/certificates/about-certificates, Feb. 8, 2023, pp. 1-8.

"About the Expressway", Aug. 17, 2022. pp. 1-12.

"Automated certificate management for TLS certificates", Retrieved from https://docs.servicenow.com/en-us/bundle/utah-it-operations-management/page/product/discovery/concept/automated-cert-requests.html, Retrieved on May 4, 2023, pp. 1-4.

"AWS Certificate Manager FAQs", Retrieved from https://aws.amazon.com/certificate-manager/faqs/, Retrieved on Mar. 24, 2023, pp. 1-17.

"Azure Instance Metadata Service", Retrieved from https://learn.microsoft.com/en-us/azure/virtual-machines/instance-metadata-service?tabs=windows, Mar. 15, 2023, pp. 1-42.

"Cisco Expressway Certificate Creation and Use Deployment Guide", Feb. 23, 2021, pp. 10.

"Deploying the CA bundle iApp", Retrieved from https://www.f5.com/pdf/deployment-guides/f5-ca-bundle-dg.pdf, Dec. 14, 2017, pp. 1-9.

(56) References Cited

OTHER PUBLICATIONS

"DigiCert Public Key Infrastructure (PKI) Platform", 2019, pp. 15.
"Get started with Key Vault certificates", Retrieved from https://learn.microsoft.com/en-us/azure/key-vault/certificates/certificate-scenarios, Retrieved on Feb. 1, 2023, pp. 1-6.
"High Availability using Patching and Rolling AP Upgrade on Cisco Catalyst 9800 Wireless Controllers", Copyright 2020, pp. 1-41.
"Manage Certificate Revocation Lists (CRLs)", Jul. 23, 2021, pp. 1-4.
"PKI secrets engine", Retrieved from https://developer.hashicorp.com/vault/docs/secrets/pki, Retrieved on May 4, 2023, pp. 1-3.
"Planning a certificate revocation list (CRL)", Retrieved from https://docs.aws.amazon.com/privateca/latest/userguide/crl-planning.html, Retrieved on Jul. 28, 2023, pp. 11.
"Release app updates with staged rollouts", Retrieved from https://support.google.com/googleplay/android-developer/answer/6346149?hl=en#zippy=%2Crelease-a-staged-rollout-to-specific-countries, Retrieved on Apr. 27, 2023, pp. 1-2.
"Release Your App Update in a Staged Rollout", Retrieved from https://developer.amazon.com/docs/app-submission/release-updates-in-staged-rollouts.html, Retrieved on Apr. 27, 2023, pp. 1-18.
"Rotate Security Certificates", Retrieved from https://www.cockroachlabs.com/docs/stable/rotate-certificates, Retrieved on May 4, 2023, pp. 1-6.
"Rotating the Root CA and Leaf Certificates", Retrieved from https://docs.pivotal.io/ops-manager/2-4/security/pcf-infrastructure/rotate-cas-and-leaf-certs.html, Nov. 5, 2020, pp. 1-9.
"Staged upgrade", Retrieved from https://www.ibm.com/docs/en/order-management-sw/9.4.0?topic=migrating-staged-upgrade, Mar. 2, 2021, pp. 1-3.
"Troubleshoot SSL certificates", Retrieved from https://cloud.google.com/load-balancing/docs/ssl-certificates/troubleshooting, Retrieved on Mar. 24, 2023, pp. 1-8.
"Tutorial: Configure certificate auto-rotation in Key Vault", Retrieved from https://learn.microsoft.com/en-us/azure/key-vault/certificates/tutorial-rotate-certificates, Feb. 27, 2023, pp. 1-6.
"Updating the CA bundle", Retrieved from https://docs.openshift.com/container-platform/4.9/security/certificates/updating-ca-bundle.html#ca-bundle-understanding_updating-ca-bundle, Retrieved on Mar. 24, 2023, pp. 1-2.
"Updating your private CA", Retrieved from https://docs.aws.amazon.com/privateca/latest/userguide/PCAUpdateCA.html, Retrieved on Mar. 24, 2023, pp. 1-4.
"Use self-managed SSL certificates", Retrieved from https://cloud.google.com/load-balancing/docs/ssl-certificates/self-managed-certs, Aug. 15, 2023, pp. 13.
"VSphere Security", vmware, Update 3, Mar. 21, 2023, pp. 1-426.
"Working with Hosts", Retrieved from https://docs.cloudstack.apache.org/projects/archived-cloudstack-administration/en/latest/hosts.html, Retrieved on Mar. 24, 2023, pp. 1-7.
Atutxa et al., "Improving efficiency and security of IIoT communications using in-network validation of server certificate", Computers in Industry, vol. 144, Jan. 2023, 103802, pp. 30.
Bigelow S.J., "Rolling deployment", Retrieved from https://www.techtarget.com/searchitoperations/definition/rolling-deployment, Jan. 2023, pp. 4.
Este-Gracias S., "Rotate your CA seamlessly using a Vault PKI", Retrieved from https://sestegra.medium.com/rotate-your-ca-seamlessly-using-a-vault-pki-9262228b4afb Sep. 29, 2022, pp. 1-49.
Ghanmi et al., "A Secure Data Storage in Multi-cloud Architecture Using Blowfish Encryption Algorithm", Advanced Information Networking and Applications, Mar. 2022, pp. 398-408.
Jamal F., "Zero Trust for SSH—Secure One-click Server Access for Software Engineering Teams", Retrieved from https://www.banyansecurity.io/blog/zero-trust-for-ssh/, Oct. 28, 2020, pp. 1-7.
Manjusha R. et al., "Secure Authentication and Access System for Cloud Computing Auditing Services Using Associated Digital Certificate", Indian Journal of Science and Technology, vol. 8 (S7), Apr. 2015, pp. 220-227.
Nexthop Team, "Updated: Creating a Certificate Revocation List Distribution Point for Your Internal Certification Authority", Retrieved from https://techcommunity.microsoft.com/t5/skype-for-business-blog/updated-creating-a-certificate-revocation-list-distribution/ba-p/620691, Dec. 17, 2012, pp. 10.
Rowley J., "Google's Moving Forward Together Proposals for Root CA Policy: Rotating ICAS More Frequently", Retrieved from https://www.digicert.com/blog/googles-moving-forward-together-proposals-for-root-ca-policy, Mar. 22, 2023, pp. 1-11.
Subhayu, "Different Phases of a Certificate Lifecycle Management Process for a secure WPA2-Enterprise network", Certificate Lifecycle Management Oct. 6, 2022, pp. 16.
Ylonen et al., "Security of Automated Access Management Using Secure Shell (SSH)", National Institute of Standards and Technology Interagency or Internal Report 7966, Aug. 2014, pp. 43.

* cited by examiner

AUTHORIZING REQUESTS FOR ACCESS CREDENTIALS, FOR ACCESSING CLOUD RESOURCES, BASED ON SUCCESSFUL STATELESS VALIDATION OF DIGITAL CERTIFICATES

TECHNICAL FIELD

The present disclosure relates to cloud computing networks. More particularly, the present disclosure relates to authorizing requests for access credentials, for accessing cloud resources, based on successful stateless validation of digital certificates.

BACKGROUND

A virtual cloud network may include cloud resources that are to be accessed by network entities located within or separate from the virtual cloud network. Conventionally, to bootstrap an authentication process, when a network entity (e.g., resource instance) is provisioned, the corresponding service (i.e., the service that "owns" or is authoritative over the resource instance being provisioned) generates a key pair; the private key is sent to the network entity, and the public key is stored with the service control plane.

Subsequently, the network entity may request from the service an access credential for accessing cloud resources. The credential request is digitally signed by the network entity using the private key (obtained during bootstrapping), and the service then validates the credential request using the stored public key. Based on the validation of the credential request, the service determines that the network entity is authorized to access the cloud resource corresponding to the credential request, the service issues the requested access credential to the network entity. The network entity may then utilize the access credential to access the cloud resource.

The content of this background section should not be construed as prior art merely by virtue of its presence in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
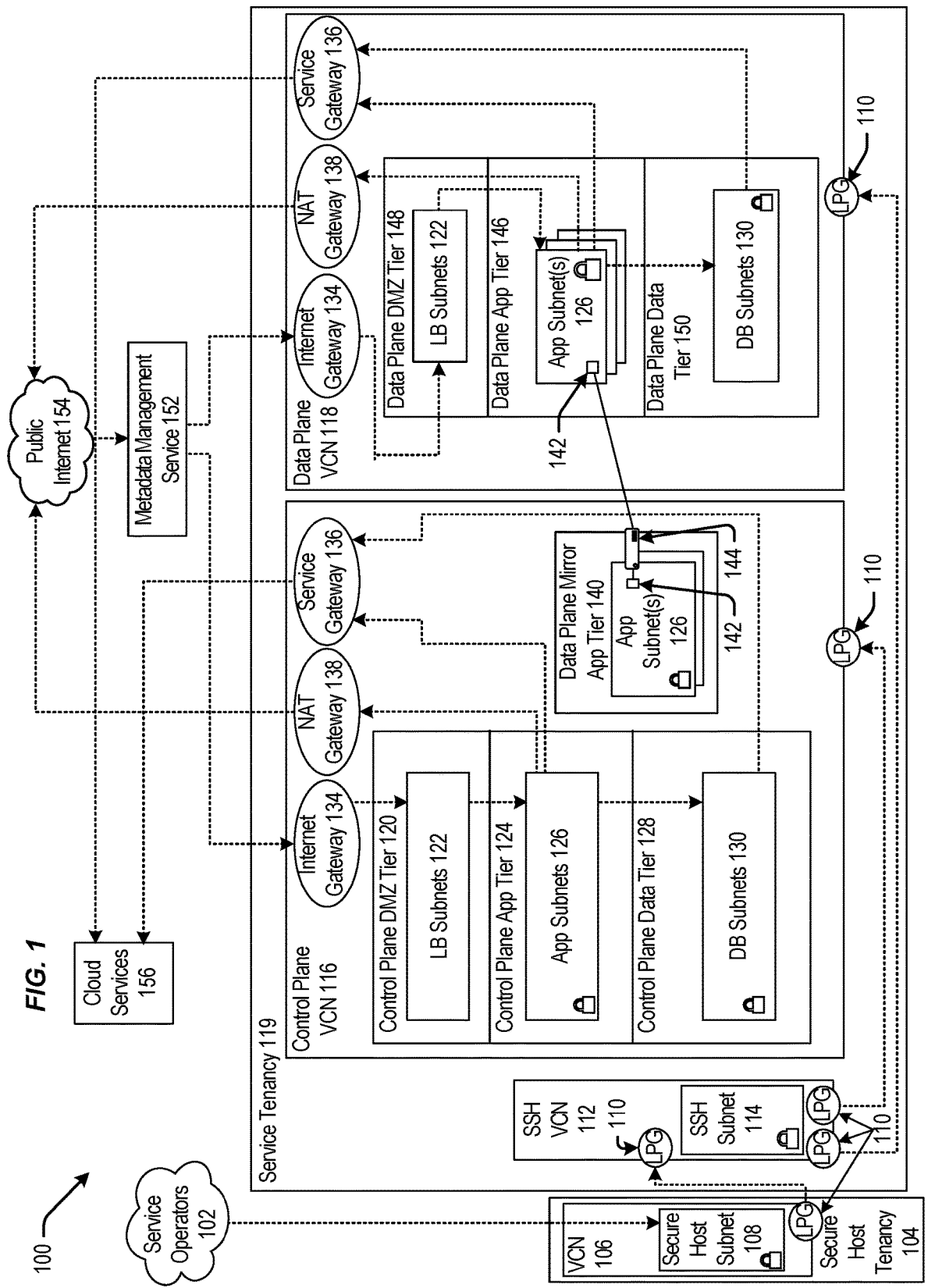
FIGS. 1-4 are block diagrams illustrating patterns for implementing a cloud infrastructure as a service system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. DEFINITIONS
3. CLOUD COMPUTING TECHNOLOGY
4. COMPUTER SYSTEM
5. ARCHITECTURAL OVERVIEW
6. PROVISIONING NETWORK ENTITIES WITH ACCESS CREDENTIALS
7. MISCELLANEOUS; EXTENSIONS

1. General Overview

One or more embodiments authorize requests for access credentials, for accessing cloud resources, based on the successful stateless validation of session state information contained in digital certificates. The session state information contained in the digital certificates allows credential requests to be authorized based on a stateless validation protocol. The session state information may include a public key associated with a network entity that submits a credential request, and the public key may be used to validate a digital signature accompanying the credential request. Additionally, or in the alternative, the session state information may include identification information associated with the network entity, and the identification information may be used to validate an identity of the network entity that submits the credential request. Because the session state information is contained in the digital certificate, the target service that owns the cloud resource need not store session state information for the network entities that may access the cloud resource. A credential request submitted by a network entity can be authorized based on a stateless validation protocol that includes validating the credential request based on the session state information contained in the digital certificate.

The target service serves as an access controller for network entities that may access cloud resources owned by the target service. The network entities that may access a cloud resource may include network entities that are located within a cloud provider infrastructure, such as a resource instance owned by a target service. Additionally, or in the alternative, the network entities that may access a cloud resource may include network entities that are external to the cloud provider infrastructure, such as network entities located on an on-premises network, or in different cloud network. In one example, the target service may provision an agent on a network entity, such as an external network entity, to perform certain operations.

In one example, the system may perform a bootstrap process in which the target service, serving as an access controller, generates an asymmetric key pair and obtains a digital certificate from a trusted certificate authority (CA). The digital certificate includes the public key of the asymmetric key pair. The private key and the digital certificate re sent to the network entity. Meanwhile, the public key need not be stored by the target service, serving as an access controller. For a network entity that is internal, the bootstrap process may be executed during provisioning of the network entity. For a network entity that is external, the bootstrap process may be executed when the agent is provisioned to the network entity.

In one example, a request for an access credential is authorized by the target service. The credential request is digitally signed by the network entity using the private key.

The target service need not retrieve any stored public key. Rather, the target service validates the digital certificate (by validating that it is signed by a trusted CA), and then relies upon the public key contained in the digital certificate to validate the digital signature of the network entity included in the credential request.

In one example, for internal network entities, the target service may obtain digital certificates from the CA. Additionally, or in the alternative, for external network entities, a user credential may form the basis for validating a certificate request. The user credential may identify a user who is requesting the digital certificate and/or provisioning of the agent on the external network entity. The target service may validate a provisioning request from an external network entity based on the user credential by comparing the user credential to information in an identity access management service. Upon successful validation of the provisioning request, the target service may initiate the bootstrap process for the eternal network entity. The target service may obtain the digital certificate by submitting a certificate signing request to a CA that includes the public key of an asymmetric key pair associated with the network entity. The target service obtains the digital certificate that includes the public key from the CA, and transmits the digital certificate to the network entity. One the network entity have obtained the digital certificate, the network entity may utilize the digital certificate to obtain an access credential for accessing the cloud resource.

In one example, the target service may retrieve the public key for each credential request from the digital certificate accompanying the credential request. The target service need not store the public key for each network entity that may access the cloud resources owned by the target service, thereby reducing administrative operations associated with maintaining current public keys for each network entity that may access the cloud resources.

In one example, the digital certificates may be configured with expiry dates. The target service will not accept an expired digital certificate. Prior to expiry, the target service or the network entity generates a new asymmetric key pair, and the target service obtain a new digital certificate that includes the new public key of the new asymmetric key pair. Thus, periodic rotation of asymmetric key pairs and digital certificates is incorporated into the technology.

One or more embodiments described in this Specification and/or recited in the claims may not be included in this General Overview section.

2. Definitions

As used herein, the term "on-premises network" refers to a network infrastructure or device that is located and operated within a physical premises or data center of a customer.

As used herein, the term "customer" refers to a third-party that receives services from a cloud provider.

As used herein, the term "cloud provider" or "service provider" refers to a provider of cloud computing services, such as an Infrastructure as a Service and/or one or more target services located on a cloud provider infrastructure.

As used herein, the term "resource consumer" refers to a network entity or a computing device that accesses cloud computing services or resources of a cloud provider. A resource consumer may be associated with a customer or a cloud provider.

As used herein, the term "multi-cloud environment" refers to a cloud computing strategy in which an organization uses and integrates services and resources from multiple cloud providers. In a multi-cloud environment, an organization may simultaneously utilize the infrastructure, platform, or software services of two or more cloud providers, rather than relying on a single cloud provider for all its cloud needs. Additionally, or in the alternative, in a multi-cloud environment, a first cloud provider may be a customer or a resource consumer with respect to a second cloud provider.

As used herein, the term "network entity" refers to a device, component, or element within a computer network and/or cloud infrastructure. A network entity may be implemented in hardware and/or software.

As used herein, the term "asymmetric key pair" refers to a public key and a private key that are associated with one another, such that a digital signature or an encryption generated using the private key may be validated or decrypted using the public key.

As used herein, the term "certificate authority certificate" or "CA certificate" refers to a digital certificate issued by a CA to establish its own identity and authenticity. A CA certificate issued by a CA may include a public key corresponding to a private key held by the CA. A certificate authority certificate may be a root CA certificate or an intermediate CA certificate. A certificate authority certificate may be used to sign and issue other digital certificates, including those used for secure communication between network entities.

As used herein, the term "certificate authority" or "CA" refers to an entity responsible for issuing and managing digital certificates. The CA may verity the identity of network entities and digitally signs their certificates to attest to their authenticity.

As used herein, the term "certificate authority service" or "CA service" refers to an entity that performs one or more operations associated with a CA.

As used herein, the term "root certificate authority certificate" or "root CA certificate" refers to a top-level CA certificate in a certificate chain or hierarchy. A root CA certificate may be self-issued and/or self-signed by a root CA. As used herein, the term "root CA" refers to a top-level CA in a CA hierarchy. A root CA may issue root CA certificates, intermediate CA certificates, or entity certificates.

As used herein, the term "intermediate certificate authority certificate" or "intermediate CA certificate" refers to an intermediate-level CA certificate in a certificate chain or hierarchy. An intermediate CA certificate may be issued by a root CA. An intermediate CA certificate is located between a root CA certificate and an entity certificate in a certificate chain or hierarchy. As used herein, the term "intermediate CA" refers to an intermediate-level CA in a CA hierarchy. An intermediate CA may issue entity certificates, for example, pursuant to authority granted to an intermediate CA according to a root CA.

As used herein, the term "entity certificate" refers to a digital certificate issued to an entity, such as a network entity associated with a virtual cloud network. An entity certificate may be used to verify the identity of the entity and enable secure communication between entities, such as between network entities in a virtual cloud network. An entity certificate may be issued by a CA, such as root CA or an intermediate CA.

In one example, an entity certificate may be an instance principal certificate. As used herein, the term "instance principal certificate" refers to a digital certificate used to authenticate and secure communication for an instance or VM associated with a virtual cloud network. In one example, instances and VMs may be created, scaled, and terminated dynamically. Instance principal certificates may be associated with an instance or VM during its lifecycle and may be automatically generated and managed by the virtual cloud network infrastructure. An instance principal certificate may have limited access to communicate with certain network entities based on permissions assigned to the network entity to which the instance principal certificate is issued.

As used herein, the term "digital certificate" refers to a digitally signed electronic document that binds a public key to the identity of an entity or certificate holder. The entity or certificate holder may hold a private key corresponding to the public key. The public key may be included in or associated with the digital certificate. The digital certificate may be validated by matching the public key to the private key through the use of cryptography. A digital certificate may conform to International Telecommunication Union standard X.509. A digital certificate may include an issuer's name, a certificate holder's name, a public key, issuer (CA) information, and expiration date. Digital certificates may be used in various security protocols, such as SSL/TLS, to establish the identity and authenticity of the communicating parties and facilitate secure communication.

3. Cloud Computing Technology

Infrastructure as a Service (IaaS) is an application of cloud computing technology. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In some cases, a cloud computing model will involve the participation of a cloud provider. The cloud provider may, but need not be, a third-party service that specializes in providing (e.g., offering, renting, selling) IaaS. An entity may also opt to deploy a private cloud, becoming its own provider of infrastructure services.

In some examples, IaaS deployment is the process of implementing a new application, or a new version of an application, onto a prepared application server or other similar device. IaaS deployment may also include the process of preparing the server (e.g., installing libraries, daemons, etc.). The deployment process is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are challenges for IaaS provisioning. There is an initial challenge of provisioning the initial set of infrastructure. There is an additional challenge of evolving the existing infrastructure (e.g., adding new services, changing services, removing services, etc.) after the initial provisioning is completed. In some cases, these challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). In some embodiments, infrastructure and resources may be provisioned (manually, and/or using a provisioning tool) prior to deployment of code to be executed on the infrastructure. However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

FIG. 1 is a block diagram illustrating an example pattern of an IaaS architecture 100, according to at least one embodiment. Service operators 102 can be communicatively coupled to a secure host tenancy 104 that can include a virtual cloud network (VCN) 106 and a secure host subnet 108. In some examples, the service operators 102 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 106 can include a local peering gateway (LPG) 110 that can be communicatively coupled to a secure shell (SSH) VCN 112 via an LPG 110 contained in the SSH VCN 112. The SSH VCN 112 can include an SSH subnet 114, and the SSH VCN 112 can be communicatively coupled to a control plane VCN 116 via the LPG 110 contained in the control plane VCN 116. Also, the SSH VCN 112 can be communicatively coupled to a data plane VCN 118 via an LPG 110. The control plane VCN 116 and the data plane VCN 118 can be contained in a service tenancy 119 that can be owned and/or operated by the IaaS provider.

The control plane VCN 116 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 120 can include one or more load balancer (LB) subnet(s) 122, a control plane app tier 124 that can include app subnet(s) 126, a control plane data tier 128 that can include database (DB) subnet(s) 130 (e.g., frontend DB subnet(s) and/or backend DB subnet(s)). The LB subnet(s) 122 contained in the control plane DMZ tier 120 can be communicatively coupled to the app subnet(s) 126 contained in the control plane app tier 124 and an Internet gateway 134 that can be contained in the control plane VCN 116, and the app subnet(s) 126 can be communicatively coupled to the DB subnet(s) 130 contained in the control plane data tier 128 and a service gateway 136 and a network address translation (NAT) gateway 138. The control plane VCN 116 can include the service gateway 136 and the NAT gateway 138.

The control plane VCN 116 can include a data plane mirror app tier 140 that can include app subnet(s) 126. The app subnet(s) 126 contained in the data plane mirror app tier 140 can include a virtual network interface controller (VNIC) 142 that can execute a compute instance 144. The compute instance 144 can communicatively couple the app subnet(s) 126 of the data plane mirror app tier 140 to app subnet(s) 126 that can be contained in a data plane app tier 146.

The data plane VCN 118 can include the data plane app tier 146, a data plane DMZ tier 148, and a data plane data tier 150. The data plane DMZ tier 148 can include LB subnet(s) 122 that can be communicatively coupled to the app subnet(s) 126 of the data plane app tier 146 and the Internet gateway 134 of the data plane VCN 118. The app subnet(s) 126 can be communicatively coupled to the service gateway 136 of the data plane VCN 118 and the NAT gateway 138 of the data plane VCN 118. The data plane data tier 150 can also include the DB subnet(s) 130 that can be communicatively coupled to the app subnet(s) 126 of the data plane app tier 146.

The Internet gateway 134 of the control plane VCN 116 and of the data plane VCN 118 can be communicatively coupled to a metadata management service 152 that can be communicatively coupled to public Internet 154. Public Internet 154 can be communicatively coupled to the NAT gateway 138 of the control plane VCN 116 and of the data plane VCN 118. The service gateway 136 of the control plane VCN 116 and of the data plane VCN 118 can be communicatively couple to cloud services 156.

In some examples, the service gateway 136 of the control plane VCN 116 or of the data plane VCN 118 can make application programming interface (API) calls to cloud services 156 without going through public Internet 154. The API calls to cloud services 156 from the service gateway 136 can be one-way: the service gateway 136 can make API calls to cloud services 156, and cloud services 156 can send requested data to the service gateway 136. But, cloud services 156 may not initiate API calls to the service gateway 136.

In some examples, the secure host tenancy 104 can be directly connected to the service tenancy 119, which may be otherwise isolated. The secure host subnet 108 can communicate with the SSH subnet 114 through an LPG 110 that may enable two-way communication over an otherwise isolated system. Connecting the secure host subnet 108 to the SSH subnet 114 may give the secure host subnet 108 access to other entities within the service tenancy 119.

The control plane VCN 116 may allow users of the service tenancy 119 to set up or otherwise provision desired resources. Desired resources provisioned in the control plane VCN 116 may be deployed or otherwise used in the data plane VCN 118. In some examples, the control plane VCN 116 can be isolated from the data plane VCN 118, and the data plane mirror app tier 140 of the control plane VCN 116 can communicate with the data plane app tier 146 of the data plane VCN 118 via VNICs 142 that can be contained in the data plane mirror app tier 140 and the data plane app tier 146.

In some examples, users of the system, or customers, can make requests, for example create, read, update, or delete (CRUD) operations, through public Internet 154 that can communicate the requests to the metadata management service 152. The metadata management service 152 can communicate the request to the control plane VCN 116 through the Internet gateway 134. The request can be received by the LB subnet(s) 122 contained in the control plane DMZ tier 120. The LB subnet(s) 122 may determine that the request is valid, and in response to this determination, the LB subnet(s) 122 can transmit the request to app subnet(s) 126 contained in the control plane app tier 124. If the request is validated and requires a call to public Internet 154, the call to public Internet 154 may be transmitted to the NAT gateway 138 that can make the call to public Internet 154. Metadata that may be desired to be stored by the request can be stored in the DB subnet(s) 130.

In some examples, the data plane mirror app tier 140 can facilitate direct communication between the control plane VCN 116 and the data plane VCN 118. For example, changes, updates, or other suitable modifications to configuration may be desired to be applied to the resources contained in the data plane VCN 118. Via a VNIC 142, the control plane VCN 116 can directly communicate with, and can thereby execute the changes, updates, or other suitable modifications to configuration to, resources contained in the data plane VCN 118.

In some embodiments, the control plane VCN 116 and the data plane VCN 118 can be contained in the service tenancy 119. In this case, the user, or the customer, of the system may not own or operate either the control plane VCN 116 or the data plane VCN 118. Instead, the IaaS provider may own or operate the control plane VCN 116 and the data plane VCN 118, both of which may be contained in the service tenancy 119. This embodiment can enable isolation of networks that may prevent users or customers from interacting with other users', or other customers', resources. Also, this embodiment may allow users or customers of the system to store databases privately without needing to rely on public Internet 154, which may not have a desired level of threat prevention, for storage.

In other embodiments, the LB subnet(s) 122 contained in the control plane VCN 116 can be configured to receive a signal from the service gateway 136. In this embodiment, the control plane VCN 116 and the data plane VCN 118 may be configured to be called by a customer of the IaaS provider without calling public Internet 154. Customers of the IaaS provider may desire this embodiment since database(s) that the customers use may be controlled by the IaaS provider and may be stored on the service tenancy 119, which may be isolated from public Internet 154.

Figure 2:
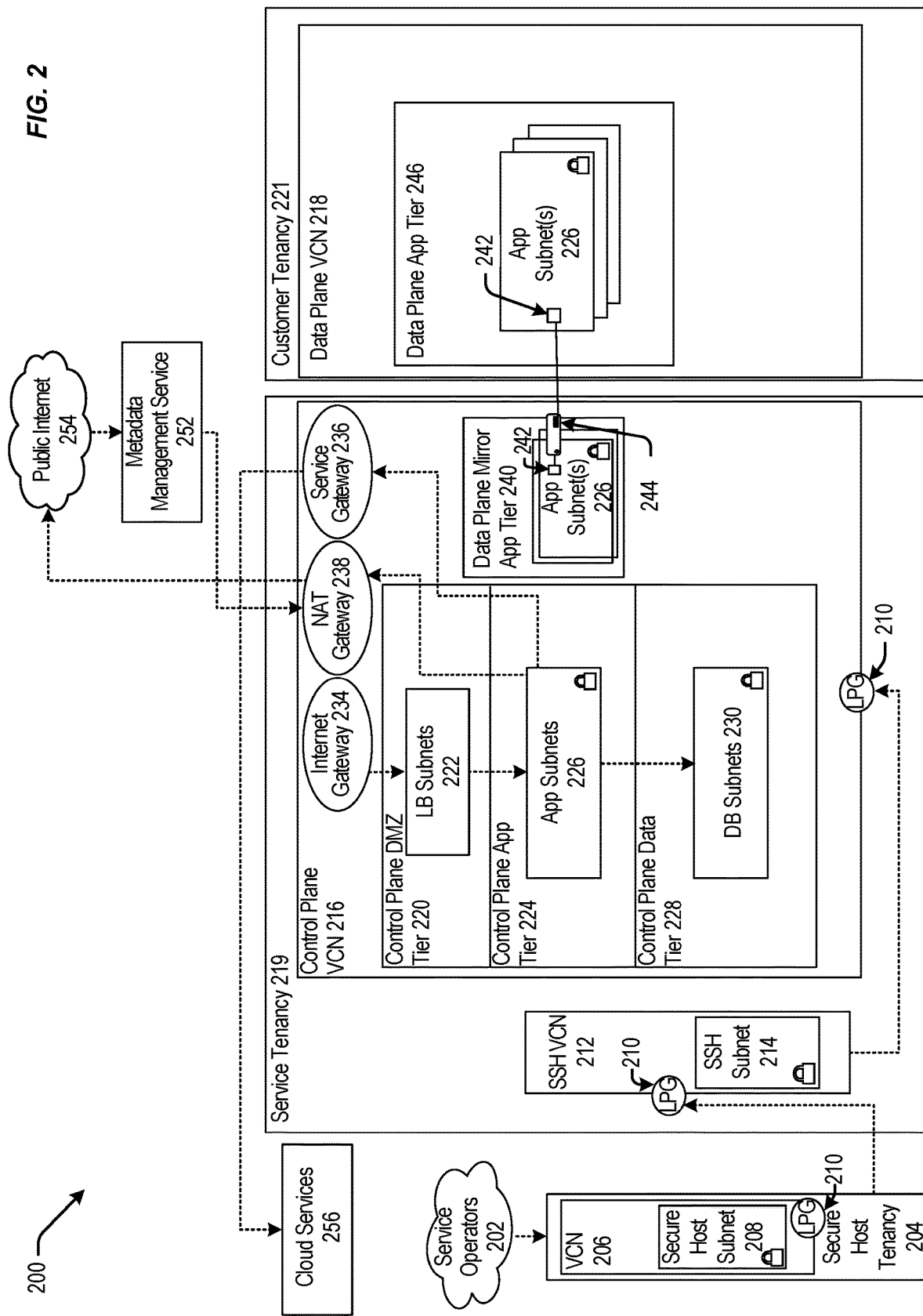

FIG. 2 is a block diagram illustrating another example pattern of an IaaS architecture 200, according to at least one embodiment. Service operators 202 (e.g., service operators 102 of FIG. 1) can be communicatively coupled to a secure host tenancy 204 (e.g., the secure host tenancy 104 of FIG. 1) that can include a virtual cloud network (VCN) 206 (e.g., the VCN 106 of FIG. 1) and a secure host subnet 208 (e.g., the secure host subnet 108 of FIG. 1). The VCN 206 can include a local peering gateway (LPG) 210 (e.g., the LPG 110 of FIG. 1) that can be communicatively coupled to a secure shell (SSH) VCN 212 (e.g., the SSH VCN 112 of FIG. 1) via an LPG 110 contained in the SSH VCN 212. The SSH VCN 212 can include an SSH subnet 214 (e.g., the SSH subnet 114 of FIG. 1), and the SSH VCN 212 can be communicatively coupled to a control plane VCN 216 (e.g., the control plane VCN 116 of FIG. 1) via an LPG 210 contained in the control plane VCN 216. The control plane VCN 216 can be contained in a service tenancy 219 (e.g., the service tenancy 119 of FIG. 1), and the data plane VCN 218 (e.g., the data plane VCN 118 of FIG. 1) can be contained in a customer tenancy 221 that may be owned or operated by users, or customers, of the system.

The control plane VCN 216 can include a control plane DMZ tier 220 (e.g., the control plane DMZ tier 120 of FIG. 1) that can include LB subnet(s) 222 (e.g., LB subnet(s) 122 of FIG. 1), a control plane app tier 224 (e.g., the control plane app tier 124 of FIG. 1) that can include app subnet(s) 226 (e.g., app subnet(s) 126 of FIG. 1), a control plane data tier 228 (e.g., the control plane data tier 128 of FIG. 1) that can include database (DB) subnet(s) 230 (e.g., similar to DB subnet(s) 130 of FIG. 1). The LB subnet(s) 222 contained in the control plane DMZ tier 220 can be communicatively coupled to the app subnet(s) 226 contained in the control plane app tier 224 and an Internet gateway 234 (e.g., the Internet gateway 134 of FIG. 1) that can be contained in the control plane VCN 216, and the app subnet(s) 226 can be communicatively coupled to the DB subnet(s) 230 contained in the control plane data tier 228 and a service gateway 236 (e.g., the service gateway 136 of FIG. 1) and a network address translation (NAT) gateway 238 (e.g., the NAT gateway 138 of FIG. 1). The control plane VCN 216 can include the service gateway 236 and the NAT gateway 238.

The control plane VCN 216 can include a data plane mirror app tier 240 (e.g., the data plane mirror app tier 140 of FIG. 1) that can include app subnet(s) 226. The app subnet(s) 226 contained in the data plane mirror app tier 240 can include a virtual network interface controller (VNIC) 242 (e.g., the VNIC of 142) that can execute a compute instance 244 (e.g., similar to the compute instance 144 of FIG. 1). The compute instance 244 can facilitate communication between the app subnet(s) 226 of the data plane mirror app tier 240 and the app subnet(s) 226 that can be contained in a data plane app tier 246 (e.g., the data plane app tier 146 of FIG. 1) via the VNIC 242 contained in the data plane mirror app tier 240 and the VNIC 242 contained in the data plane app tier 246.

The Internet gateway 234 contained in the control plane VCN 216 can be communicatively coupled to a metadata management service 252 (e.g., the metadata management service 152 of FIG. 1) that can be communicatively coupled to public Internet 254 (e.g., public Internet 154 of FIG. 1). Public Internet 254 can be communicatively coupled to the NAT gateway 238 contained in the control plane VCN 216. The service gateway 236 contained in the control plane VCN 216 can be communicatively couple to cloud services 256 (e.g., cloud services 156 of FIG. 1).

In some examples, the data plane VCN 218 can be contained in the customer tenancy 221. In this case, the IaaS provider may provide the control plane VCN 216 for each customer, and the IaaS provider may, for each customer, set up a unique, compute instance 244 that is contained in the service tenancy 219. Each compute instance 244 may allow communication between the control plane VCN 216, contained in the service tenancy 219, and the data plane VCN 218 that is contained in the customer tenancy 221. The compute instance 244 may allow resources, that are provisioned in the control plane VCN 216 that is contained in the service tenancy 219, to be deployed or otherwise used in the data plane VCN 218 that is contained in the customer tenancy 221.

In other examples, the customer of the IaaS provider may have databases that live in the customer tenancy 221. In this example, the control plane VCN 216 can include the data plane mirror app tier 240 that can include app subnet(s) 226. The data plane mirror app tier 240 can reside in the data plane VCN 218, but the data plane mirror app tier 240 may not live in the data plane VCN 218. That is, the data plane mirror app tier 240 may have access to the customer tenancy 221, but the data plane mirror app tier 240 may not exist in the data plane VCN 218 or be owned or operated by the customer of the IaaS provider. The data plane mirror app tier 240 may be configured to make calls to the data plane VCN 218 but may not be configured to make calls to any entity contained in the control plane VCN 216. The customer may desire to deploy or otherwise use resources in the data plane VCN 218 that are provisioned in the control plane VCN 216, and the data plane mirror app tier 240 can facilitate the desired deployment, or other usage of resources, of the customer.

In some embodiments, the customer of the IaaS provider can apply filters to the data plane VCN 218. In this embodiment, the customer can determine what the data plane VCN 218 can access, and the customer may restrict access to public Internet 254 from the data plane VCN 218. The IaaS provider may not be able to apply filters or otherwise control access of the data plane VCN 218 to any outside networks or databases. Applying filters and controls by the customer onto the data plane VCN 218, contained in the customer tenancy 221, can help isolate the data plane VCN 218 from other customers and from public Internet 254.

In some embodiments, cloud services 256 can be called by the service gateway 236 to access services that may not exist on public Internet 254, on the control plane VCN 216, or on the data plane VCN 218. The connection between cloud services 256 and the control plane VCN 216 or the data plane VCN 218 may not be live or continuous. Cloud services 256 may exist on a different network owned or operated by the IaaS provider. Cloud services 256 may be configured to receive calls from the service gateway 236 and may be configured to not receive calls from public Internet 254. Some cloud services 256 may be isolated from other cloud services 256, and the control plane VCN 216 may be isolated from cloud services 256 that may not be in the same region as the control plane VCN 216. For example, the control plane VCN 216 may be located in "Region 1," and cloud service "Deployment 1," may be located in Region 1 and in "Region 2." If a call to Deployment 1 is made by the service gateway 236 contained in the control plane VCN 216 located in Region 1, the call may be transmitted to Deployment 1 in Region 1. In this example, the control plane VCN 216, or Deployment 1 in Region 1, may not be communicatively coupled to, or otherwise in communication with, Deployment 1 in Region 2.

Figure 3:
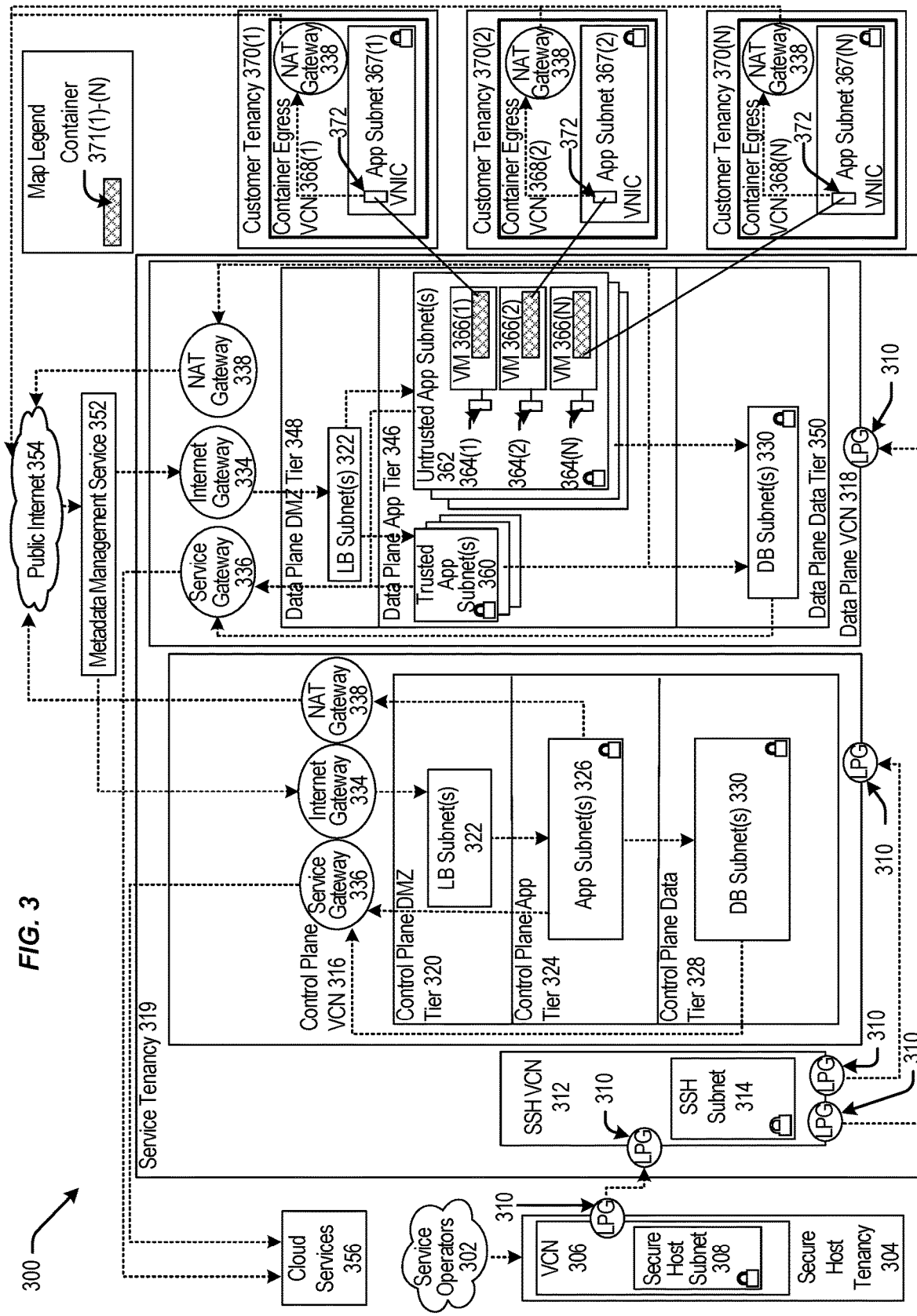

FIG. 3 is a block diagram illustrating another example pattern of an IaaS architecture 300, according to at least one embodiment. Service operators 302 (e.g., service operators 102 of FIG. 1) can be communicatively coupled to a secure host tenancy 304 (e.g., the secure host tenancy 104 of FIG. 1) that can include a virtual cloud network (VCN) 306 (e.g., the VCN 106 of FIG. 1) and a secure host subnet 308 (e.g., the secure host subnet 108 of FIG. 1). The VCN 306 can include an LPG 310 (e.g., the LPG 110 of FIG. 1) that can be communicatively coupled to an SSH VCN 312 (e.g., the SSH VCN 112 of FIG. 1) via an LPG 310 contained in the SSH VCN 312. The SSH VCN 312 can include an SSH subnet 314 (e.g., the SSH subnet 114 of FIG. 1), and the SSH VCN 312 can be communicatively coupled to a control plane VCN 316 (e.g., the control plane VCN 116 of FIG. 1) via an LPG 310 contained in the control plane VCN 316 and to a data plane VCN 318 (e.g., the data plane VCN 118 of FIG. 1) via an LPG 310 contained in the data plane VCN 318. The control plane VCN 316 and the data plane VCN 318 can be contained in a service tenancy 319 (e.g., the service tenancy 119 of FIG. 1).

The control plane VCN 316 can include a control plane DMZ tier 320 (e.g., the control plane DMZ tier 120 of FIG. 1) that can include load balancer (LB) subnet(s) 322 (e.g., LB subnet(s) 122 of FIG. 1), a control plane app tier 324 (e.g., the control plane app tier 124 of FIG. 1) that can include app subnet(s) 326 (e.g., similar to app subnet(s) 126 of FIG. 1), a control plane data tier 328 (e.g., the control plane data tier 128 of FIG. 1) that can include DB subnet(s) 330. The LB subnet(s) 322 contained in the control plane DMZ tier 320 can be communicatively coupled to the app subnet(s) 326 contained in the control plane app tier 324 and to an Internet gateway 334 (e.g., the Internet gateway 134 of FIG. 1) that can be contained in the control plane VCN 316, and the app subnet(s) 326 can be communicatively coupled to the DB subnet(s) 330 contained in the control plane data tier 328 and to a service gateway 336 (e.g., the service gateway of FIG. 1) and a network address translation (NAT) gateway 338 (e.g., the NAT gateway 138 of FIG. 1). The control plane VCN 316 can include the service gateway 336 and the NAT gateway 338.

The data plane VCN 318 can include a data plane app tier 346 (e.g., the data plane app tier 146 of FIG. 1), a data plane DMZ tier 348 (e.g., the data plane DMZ tier 148 of FIG. 1), and a data plane data tier 350 (e.g., the data plane data tier 150 of FIG. 1). The data plane DMZ tier 348 can include LB subnet(s) 322 that can be communicatively coupled to trusted app subnet(s) 360 and untrusted app subnet(s) 362 of the data plane app tier 346 and the Internet gateway 334 contained in the data plane VCN 318. The trusted app subnet(s) 360 can be communicatively coupled to the service gateway 336 contained in the data plane VCN 318, the NAT gateway 338 contained in the data plane VCN 318, and DB subnet(s) 330 contained in the data plane data tier 350. The untrusted app subnet(s) 362 can be communicatively coupled to the service gateway 336 contained in the data plane VCN 318 and DB subnet(s) 330 contained in the data plane data tier 350. The data plane data tier 350 can include DB subnet(s) 330 that can be communicatively coupled to the service gateway 336 contained in the data plane VCN 318.

The untrusted app subnet(s) 362 can include one or more primary VNICs 364(1)-(N) that can be communicatively coupled to tenant virtual machines (VMs) 366(1)-(N). Each tenant VM 366(1)-(N) can be communicatively coupled to a respective app subnet 367(1)-(N) that can be contained in respective container egress VCNs 368(1)-(N) that can be contained in respective customer tenancies 380(1)-(N). Respective secondary VNICs 372(1)-(N) can facilitate communication between the untrusted app subnet(s) 362 contained in the data plane VCN 318 and the app subnet contained in the container egress VCNs 368(1)-(N). Each container egress VCNs 368(1)-(N) can include a NAT gateway 338 that can be communicatively coupled to public Internet 354 (e.g., public Internet 154 of FIG. 1).

The Internet gateway 334 contained in the control plane VCN 316 and contained in the data plane VCN 318 can be communicatively coupled to a metadata management service 352 (e.g., the metadata management service 152 of FIG. 1) that can be communicatively coupled to public Internet 354. Public Internet 354 can be communicatively coupled to the NAT gateway 338 contained in the control plane VCN 316 and contained in the data plane VCN 318. The service gateway 336 contained in the control plane VCN 316 and contained in the data plane VCN 318 can be communicatively couple to cloud services 356.

In some embodiments, the data plane VCN 318 can be integrated with customer tenancies 380. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 346. Code to run the function may be executed in the VMs 366(1)-(N), and the code may not be configured to run anywhere else on the data plane VCN 318. Each VM 366(1)-(N) may be connected to one customer tenancy 380. Respective containers 381(1)-(N) contained in the VMs 366(1)-(N) may be configured to run the code. In this case, there can be a dual isolation (e.g., the containers 381(1)-(N)

running code, where the containers 381(1)-(N) may be contained in at least the VM 366(1)-(N) that are contained in the untrusted app subnet(s) 362), which may help prevent incorrect or otherwise undesirable code from damaging the network of the IaaS provider or from damaging a network of a different customer. The containers 381(1)-(N) may be communicatively coupled to the customer tenancy 380 and may be configured to transmit or receive data from the customer tenancy 380. The containers 381(1)-(N) may not be configured to transmit or receive data from any other entity in the data plane VCN 318. Upon completion of running the code, the IaaS provider may kill or otherwise dispose of the containers 381(1)-(N).

In some embodiments, the trusted app subnet(s) 360 may run code that may be owned or operated by the IaaS provider. In this embodiment, the trusted app subnet(s) 360 may be communicatively coupled to the DB subnet(s) 330 and be configured to execute CRUD operations in the DB subnet(s) 330. The untrusted app subnet(s) 362 may be communicatively coupled to the DB subnet(s) 330, but in this embodiment, the untrusted app subnet(s) may be configured to execute read operations in the DB subnet(s) 330. The containers 381(1)-(N) that can be contained in the VM 366(1)-(N) of each customer and that may run code from the customer may not be communicatively coupled with the DB subnet(s) 330.

In other embodiments, the control plane VCN 316 and the data plane VCN 318 may not be directly communicatively coupled. In this embodiment, there may be no direct communication between the control plane VCN 316 and the data plane VCN 318. However, communication can occur indirectly through at least one method. An LPG 310 may be established by the IaaS provider that can facilitate communication between the control plane VCN 316 and the data plane VCN 318. In another example, the control plane VCN 316 or the data plane VCN 318 can make a call to cloud services 356 via the service gateway 336. For example, a call to cloud services 356 from the control plane VCN 316 can include a request for a service that can communicate with the data plane VCN 318.

Figure 4:
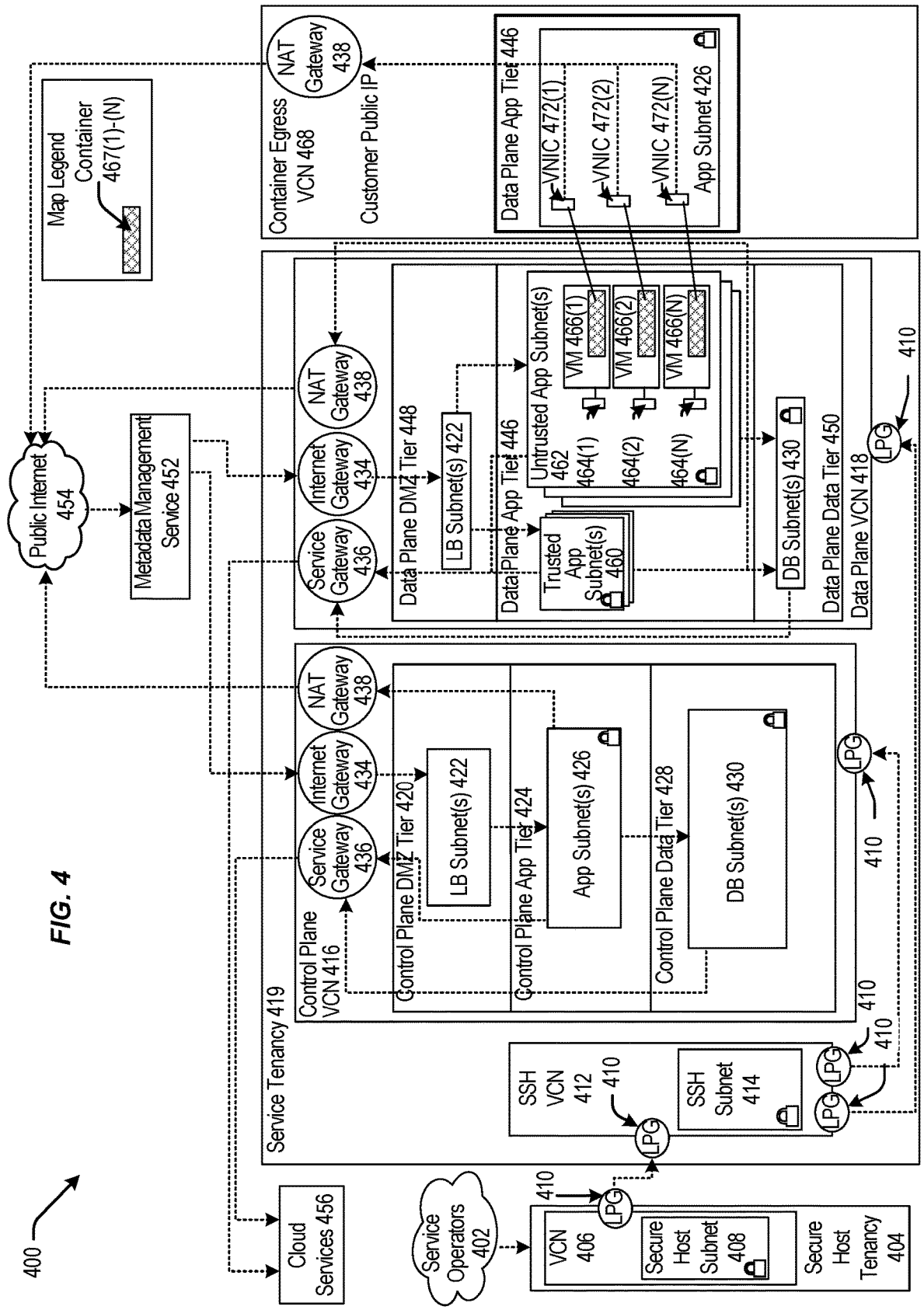

FIG. 4 is a block diagram illustrating another example pattern of an IaaS architecture 400, according to at least one embodiment. Service operators 402 (e.g., service operators 102 of FIG. 1) can be communicatively coupled to a secure host tenancy 404 (e.g., the secure host tenancy 104 of FIG. 1) that can include a virtual cloud network (VCN) 406 (e.g., the VCN 106 of FIG. 1) and a secure host subnet 408 (e.g., the secure host subnet 108 of FIG. 1). The VCN 406 can include an LPG 410 (e.g., the LPG 110 of FIG. 1) that can be communicatively coupled to an SSH VCN 412 (e.g., the SSH VCN 112 of FIG. 1) via an LPG 410 contained in the SSH VCN 412. The SSH VCN 412 can include an SSH subnet 414 (e.g., the SSH subnet 114 of FIG. 1), and the SSH VCN 412 can be communicatively coupled to a control plane VCN 416 (e.g., the control plane VCN 116 of FIG. 1) via an LPG 410 contained in the control plane VCN 416 and to a data plane VCN 418 (e.g., the data plane VCN 118 of FIG. 1) via an LPG 410 contained in the data plane VCN 418. The control plane VCN 416 and the data plane VCN 418 can be contained in a service tenancy 419 (e.g., the service tenancy 119 of FIG. 1).

The control plane VCN 416 can include a control plane DMZ tier 420 (e.g., the control plane DMZ tier 120 of FIG. 1) that can include LB subnet(s) 422 (e.g., LB subnet(s) 122 of FIG. 1), a control plane app tier 424 (e.g., the control plane app tier 124 of FIG. 1) that can include app subnet(s) 426 (e.g., app subnet(s) 126 of FIG. 1), a control plane data tier 428 (e.g., the control plane data tier 128 of FIG. 1) that can include DB subnet(s) 430 (e.g., DB subnet(s) 330 of FIG. 3). The LB subnet(s) 422 contained in the control plane DMZ tier 420 can be communicatively coupled to the app subnet(s) 426 contained in the control plane app tier 424 and to an Internet gateway 434 (e.g., the Internet gateway 134 of FIG. 1) that can be contained in the control plane VCN 416, and the app subnet(s) 426 can be communicatively coupled to the DB subnet(s) 430 contained in the control plane data tier 428 and to a service gateway 436 (e.g., the service gateway of FIG. 1) and a network address translation (NAT) gateway 438 (e.g., the NAT gateway 138 of FIG. 1). The control plane VCN 416 can include the service gateway 436 and the NAT gateway 438.

The data plane VCN 418 can include a data plane app tier 446 (e.g., the data plane app tier 146 of FIG. 1), a data plane DMZ tier 448 (e.g., the data plane DMZ tier 148 of FIG. 1), and a data plane data tier 450 (e.g., the data plane data tier 150 of FIG. 1). The data plane DMZ tier 448 can include LB subnet(s) 422 that can be communicatively coupled to trusted app subnet(s) 460 (e.g., trusted app subnet(s) 360 of FIG. 3) and untrusted app subnet(s) 462 (e.g., untrusted app subnet(s) 362 of FIG. 3) of the data plane app tier 446 and the Internet gateway 434 contained in the data plane VCN 418. The trusted app subnet(s) 460 can be communicatively coupled to the service gateway 436 contained in the data plane VCN 418, the NAT gateway 438 contained in the data plane VCN 418, and DB subnet(s) 430 contained in the data plane data tier 450. The untrusted app subnet(s) 462 can be communicatively coupled to the service gateway 436 contained in the data plane VCN 418 and DB subnet(s) 430 contained in the data plane data tier 450. The data plane data tier 450 can include DB subnet(s) 430 that can be communicatively coupled to the service gateway 436 contained in the data plane VCN 418.

The untrusted app subnet(s) 462 can include primary VNICs 464(1)-(N) that can be communicatively coupled to tenant virtual machines (VMs) 466(1)-(N) residing within the untrusted app subnet(s) 462. Each tenant VM 466(1)-(N) can run code in a respective container 467(1)-(N), and be communicatively coupled to an app subnet 426 that can be contained in a data plane app tier 446 that can be contained in a container egress VCN 468. Respective secondary VNICs 472(1)-(N) can facilitate communication between the untrusted app subnet(s) 462 contained in the data plane VCN 418 and the app subnet contained in the container egress VCN 468. The container egress VCN can include a NAT gateway 438 that can be communicatively coupled to public Internet 454 (e.g., public Internet 154 of FIG. 1).

The Internet gateway 434 contained in the control plane VCN 416 and contained in the data plane VCN 418 can be communicatively coupled to a metadata management service 452 (e.g., the metadata management service 152 of FIG. 1) that can be communicatively coupled to public Internet 454. Public Internet 454 can be communicatively coupled to the NAT gateway 438 contained in the control plane VCN 416 and contained in the data plane VCN 418. The service gateway 436 contained in the control plane VCN 416 and contained in the data plane VCN 418 can be communicatively couple to cloud services 456.

In some examples, the pattern illustrated by the architecture of block diagram 400 of FIG. 4 may be considered an exception to the pattern illustrated by the architecture of block diagram 300 of FIG. 3 and may be desirable for a customer of the IaaS provider if the IaaS provider cannot directly communicate with the customer (e.g., a disconnected region). The respective containers 467(1)-(N) that are contained in the VMs 466(1)-(N) for each customer can be accessed in real-time by the customer. The containers 467(1)-(N) may be configured to make calls to respective secondary VNICs 472(1)-(N) contained in app subnet(s) 426 of the data plane app tier 446 that can be contained in the container egress VCN 468. The secondary VNICs 472(1)-(N) can transmit the calls to the NAT gateway 438 that may transmit the calls to public Internet 454. In this example, the containers 467(1)-(N) that can be accessed in real-time by the customer can be isolated from the control plane VCN 416 and can be isolated from other entities contained in the data plane VCN 418. The containers 467(1)-(N) may also be isolated from resources from other customers.

In other examples, the customer can use the containers 467(1)-(N) to call cloud services 456. In this example, the customer may run code in the containers 467(1)-(N) that requests a service from cloud services 456. The containers 467(1)-(N) can transmit this request to the secondary VNICs 472(1)-(N) that can transmit the request to the NAT gateway that can transmit the request to public Internet 454. Public Internet 454 can transmit the request to LB subnet(s) 422 contained in the control plane VCN 416 via the Internet gateway 434. In response to determining the request is valid, the LB subnet(s) can transmit the request to app subnet(s) 426 that can transmit the request to cloud services 456 via the service gateway 436.

It should be appreciated that IaaS architectures 100, 200, 300, 400 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

4. Computer System

Figure 5:
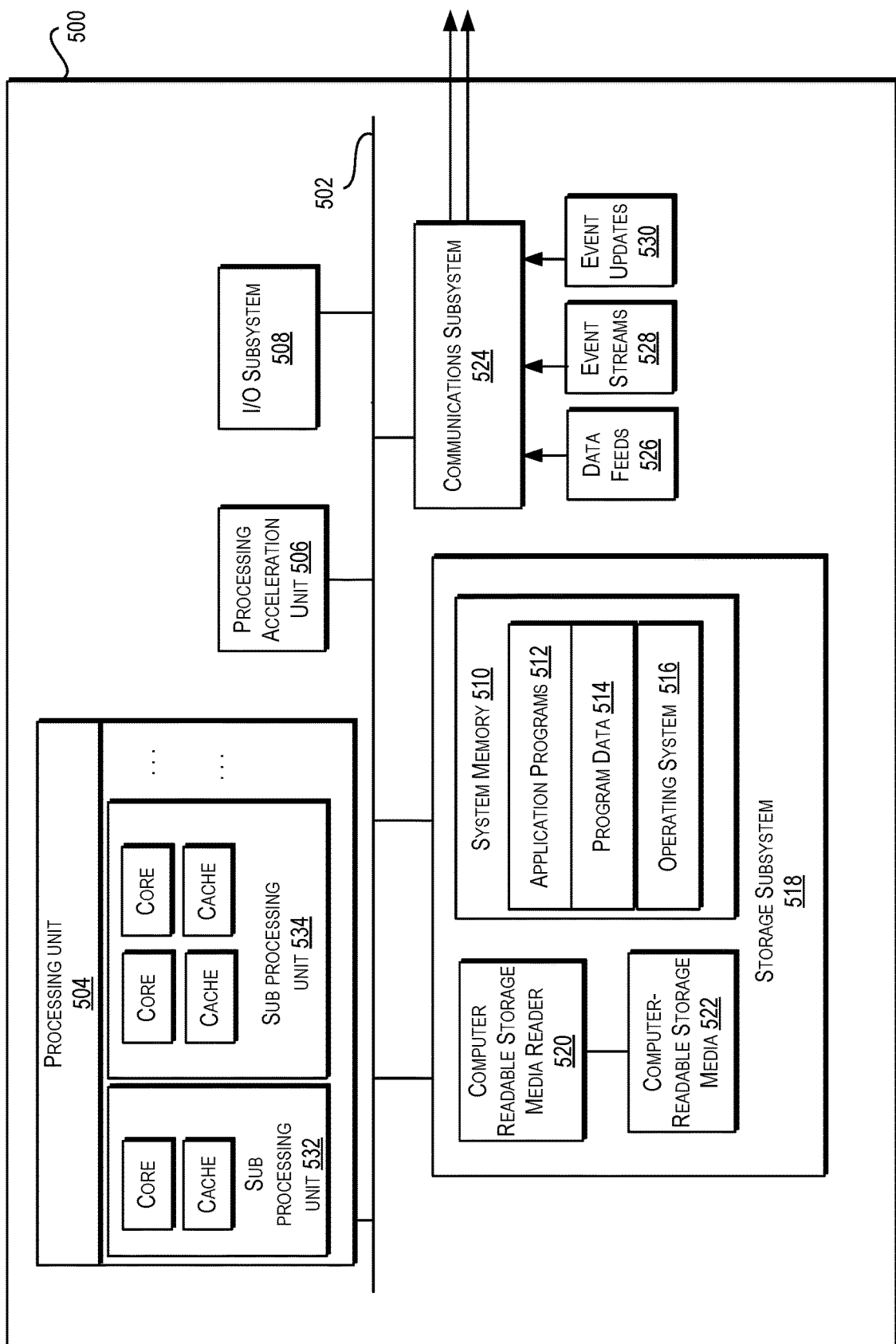
FIG. 5 is a hardware system in accordance with one or more embodiments.

FIG. 5 illustrates an example computer system 500, in which various embodiments may be implemented. The system 500 may be used to implement any of the computer systems described above. As shown in FIG. 5, computer system 500 includes a processing unit 504 that communicates with a number of peripheral subsystems via a bus subsystem 502. These peripheral subsystems may include a processing acceleration unit 506, an I/O subsystem 508, a storage subsystem 518 and a communications subsystem 524. Storage subsystem 518 includes tangible computer-readable storage media 522 and a system memory 510.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which can be implemented as one or more integrated circuits (e.g., a conventional microprocessor or microcontroller), controls the operation of computer system 500. One or more processors may be included in processing unit 504. These processors may include single core or multicore processors. In certain embodiments, processing unit 504 may be implemented as one or more independent processing units 532 and/or 534 with single or multicore processors included in each processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, some or all of the program code to be executed can be resident in processing unit 504 and/or in storage subsystem 518. Through suitable programming, processing unit 504 can provide various functionalities described above. Computer system 500 may additionally include a processing acceleration unit 506, which can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 500 may comprise a storage subsystem 518 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 504 provide the functionality described above. Storage subsystem 518 may also provide a repository for storing data used in accordance with the present disclosure.

As depicted in the example in FIG. 5, storage subsystem 518 can include various components including a system memory 510, computer-readable storage media 522, and a computer readable storage media reader 520. System memory 510 may store program instructions, such as application programs 512, that are loadable and executable by processing unit 504. System memory 510 may also store data, such as program data 514, that is used during the execution of the instructions and/or data that is generated during the execution of the program instructions. Various different kinds of programs may be loaded into system memory 510 including but not limited to client applications, Web browsers, mid-tier applications, relational database management systems (RDBMS), virtual machines, containers, etc.

System memory 510 may also store an operating system 516. Examples of operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 500 executes one or more virtual machines, the virtual machines along with their guest operating systems (GOSs) may be loaded into system memory 510 and executed by one or more processors or cores of processing unit 504.

System memory 510 can come in different configurations depending upon the type of computer system 500. For example, system memory 510 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 510 may include a basic input/output system (BIOS) containing basic routines that help to transfer information between elements within computer system 500, such as during start-up.

Computer-readable storage media 522 may represent remote, local, fixed, and/or removable storage devices plus storage media for temporarily and/or more permanently containing, storing, computer-readable information for use by computer system 500 including instructions executable by processing unit 504 of computer system 500.

Computer-readable storage media 522 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 522 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Machine-readable instructions executable by one or more processors or cores of processing unit 504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments communications subsystem 524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 524 may also be configured to receive data in the form of continuous data streams, which may include event streams 528 of real-time events and/or event updates 530, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in FIG. 5 is intended only as a specific example. Many other configurations having more or fewer components than the system depicted in FIG. 5 are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

5. Architectural Overview

Figure 6:
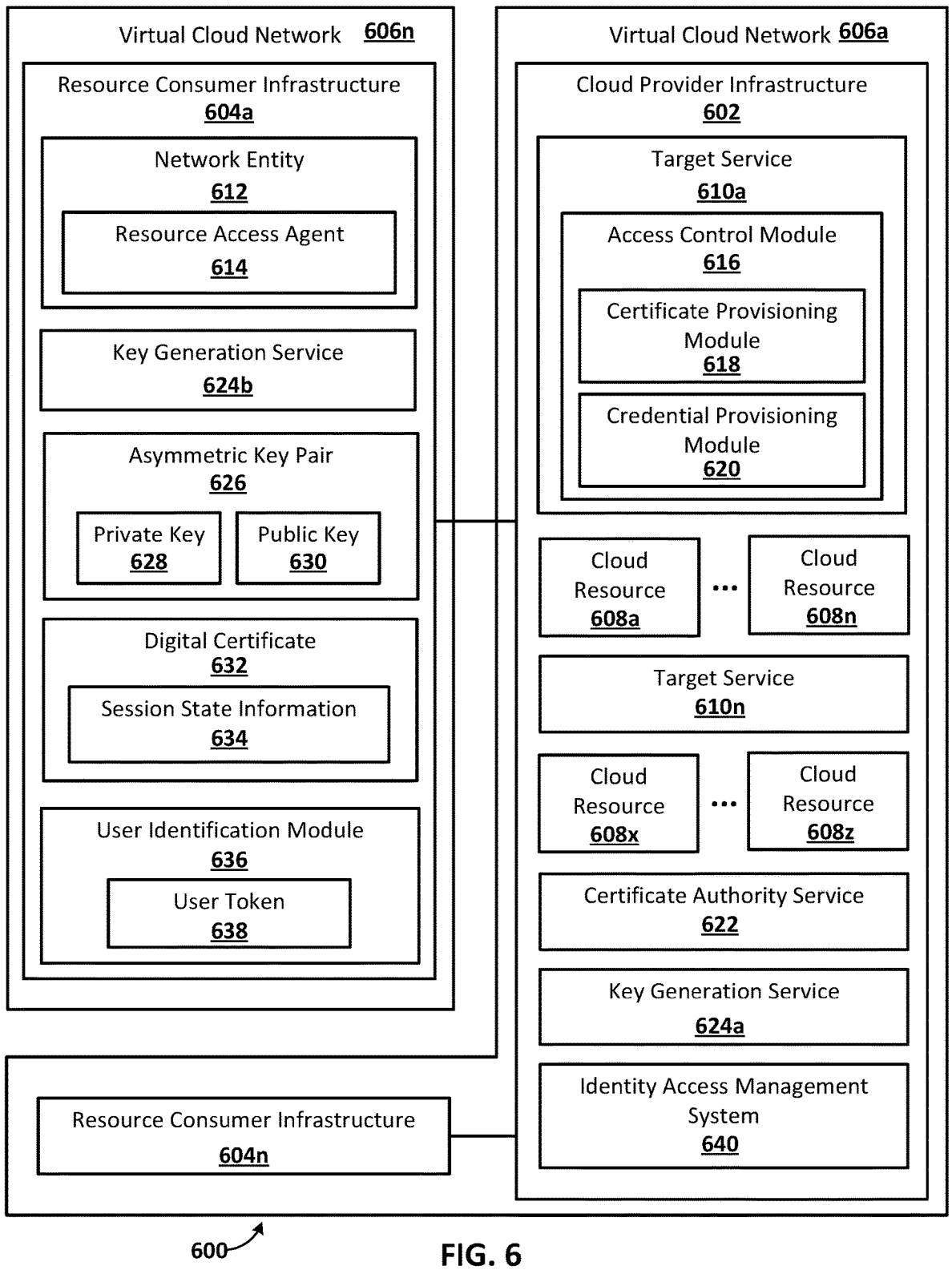
FIG. 6 illustrates features of an example system in accordance with one or more embodiments.

FIG. 6 illustrate one example of a system 600 in accordance with one or more embodiments. The system 600 described with reference to FIG. 6 may perform operations associated with provisioning a network entity with an access credential for accessing a cloud resource. The system 600 may also perform operations associated with the network entity utilizing the access credential, directly or indirectly, to access the cloud resource.

As shown in FIG. 6, the system 600 may include a cloud provider infrastructure 602 and at least one resource consumer infrastructure 604. In one example, as shown, the system 600 may include resource consumer infrastructure 604a and resource consumer infrastructure 604n. The cloud provider infrastructure 602 may be located on a virtual cloud network 606, such as virtual cloud network 606a. In one example, a resource consumer infrastructure 604 may be located on a virtual cloud network 606. Additionally, or in the alternative, a resource consumer infrastructure 604 may include a computing device that is separate from a virtual cloud network 606. In one example, a resource consumer infrastructure 604 may be located on a different virtual cloud network 606 from the cloud provider infrastructure 602. For example, as shown in FIG. 6, the cloud provider infrastructure 602 is located on virtual cloud network 606a, and resource consumer infrastructure 604a is located on virtual cloud network 606n. In one example, virtual cloud network 606a and virtual cloud network 606n may represent a multi-cloud environment. For example, virtual cloud network 606a may be associated with a first cloud provider, and virtual cloud network 606n may be associated with a second cloud provider. Additionally, or in the alternative, a resource consumer infrastructure 604 may be located on the same virtual cloud network 606 as the cloud provider infrastructure 602. For example, as shown in FIG. 6, the cloud provider infrastructure 602 and resource consumer infrastructure 604n are both located on virtual cloud network 606a. In one example, the resource consumer infrastructure 604n may be located on an on-premises network.

The cloud provider infrastructure 602 may include one or more cloud resources 608 and one or more target services 610 that respectively serve as an access-controller for at least one of the one or more cloud resources 608. In one example, target service 610a may serve as an access controller with respect to cloud resource 608a and cloud resource 608n. Additionally, or in the alternative, target service 610n may serve as an access controller with respect to cloud resource 608x and 608z. In addition to serving as an access controller, a target service 610 may perform operations associated with provisioning, management, and/or maintenance of one or more cloud resources 608. The operations performed by a target service 610 may be performed on behalf of a cloud provider and/or on behalf of a resource consumer.

The resource consumer infrastructure 604 may include one or more network entities 612 that may access one or more cloud resources 608, for example, via a target service 610 that serves as an access controller for the one or more cloud resources 608. In one example, the network entity may be a device, component, or element within the resource consumer infrastructure. Additionally, or in the alternative, the network entity may be a resource instance provisioned by the target service 610 on the resource consumer infrastructure. The target service 610 may "own" the resource instance, meaning that the target service 610 may be responsible for provisioning, management, and/or maintenance of that resource instance on behalf of a cloud provider or resource consumer.

In one example, the resource consumer infrastructure 604 may include at least one resource access agent 614. A resource access agent 614 may perform operations associated with accessing the one or more cloud resources 608 on the cloud provider infrastructure 602. In one example, a resource access agent 614 may be installed on a network entity 612. For example, each network entity 612 may include a resource access agent 614. Additionally, or in the alternative, a resource access agent may be installed on the resource consumer infrastructure 604, and one or more network entities 612 may utilize the resource access agent 614 to access the one or more cloud resources 608 on the cloud provider infrastructure 602. The resource access agent 614 may perform one or more operations on behalf of a network entity 612. Additionally, or in the alternative, the network entity 612 may perform one or more operations directly, without utilizing a resource access agent 614.

In one example, a target service 610 may include an access control module 616. The access control module 616 may perform one or more operations associated with controlling access to one or more cloud resources 608. The access control module 616 may include a certificate provisioning module 618 and a credential provisioning module 620. The certificate provisioning module 618 may perform one or more operations associated with a provisioning process that includes provisioning a network entity 612 with a digital certificate. A digital certificate that is provisioned to a network entity 612 may include session state information that can be authorized based on a stateless validation protocol. The digital certificate may be utilized by the network entity 612 to obtain an access credential for accessing one or more cloud resources 608. The credential provisioning module 620 may perform one or more operations associated with provisioning the network entity with an access credential for accessing the one or more cloud resources 608. The credential provisioning module 620 may provision the network entity with an access credential responsive to a determination that the network entity is authorized to be provisioned with the access credential. The determination that the network entity is authorized to be provisioned with the access credential may be based on the network entity transmitting to the target service 610, a credential request that includes the digital certificate, and the target service 610 causing the access control module 616 to validate the credential request based on the session state information in the digital certificate.

For a network entity 612 to obtain access to a cloud resource 608, the target service 610 may provision the network entity 612 with a digital certificate that includes session state information, and the network entity 612 (or the resource access agent 614) may utilize the digital certificate to obtain an access credential for accessing the cloud resource 608. In one example, a provision process that includes provisioning the network entity 612 with a digital certificate may be initiated by the target service 610. The target service 610 may initiate the provisioning process when instantiating a network entity 612 on a virtual cloud network 606, such as a network entity 612 that is located on the same virtual cloud network 606 as the target service 610 and/or the cloud resource 608 to be accessed by the network entity 612. Additionally, or in the alternative, the provisioning process may be initiated by the network entity 612 (or the resource access agent 614) transmitting a provisioning request to the target service 610. The target service 610 may provision the network entity 612 with a digital certificate in response to validating a provisioning request received from the network entity 612.

To provision a network entity 612 with a digital certificate, the target service 610 may generate a certificate signing request, and transmit the certificate signing request to a CA service 622. The certificate signing request may include a request for the CA service to issue a digital certificate to the network entity 612 for use in the stateless validation protocol. The certificate signing request may include the session state information to be included in the digital certificate. A CA associated with the CA service may issue the digital certificate, and the CA service 622 may transmit the digital certificate to the target service 610. The target service 610 may then transmit the digital certificate to the network entity 612. The cloud provider may include a key generation service 624a.

The cloud provider infrastructure 602 may include a key generation service 624a for generating an asymmetric key pair associated with a network entity 612, for example, when the provisioning process is initiated by the target service 610. Additionally, or in the alternative, the resource consumer infrastructure 604 may include a key generation service 624b, for generating an asymmetric key pair associated with a network entity 612, for example, when the provisioning process is initiated by the network entity 612 (or the resource access agent 614).

When the target service 610 initiates the provisioning process, the target service 610 may cause the key generation service 624a to generate an asymmetric key pair associated with the network entity 612. The target service 610 may include the public key of the asymmetric key pair in the certificate signing request that the target service 610 transmits to the CA service 622. The CA service may include the public key in the digital certificate issued to the network entity 612 by the CA. The CA service 622 may transmit the digital certificate to the target service 610, and the target service 610 may transmit the digital certificate, and the private key corresponding to the public key included in the digital certificate, to the network entity 612 (or the resource access agent 614). The network entity 612 may retain the digital certificate and the private key for use in credential requests that the network entity 612 (or the resource access agent 614) submit to the target service 610. Additionally, or in the alternative, the target service 610 may include the identification associated with the network entity 612 in the certificate signing request, and the CA service 622 may include the identification in the digital certificate issued to the network entity 612.

When the network entity 612 (or the resource access agent 614) initiates the provisioning process, for example, by transmitting a provisioning request to the target service 610, the network entity 612 (or the resource access agent 614) may cause the key generation service 624a to generate an asymmetric key pair associated with the network entity 612. The network entity 612 (or the resource access agent 614) may transmit the public key of the asymmetric key pair to the target service 610, and the target service 610 may include the public key in the certificate signing request that the target service 610 transmits to the CA service 622. Additionally, or in the alternative, the network entity 612 (or the resource access agent 614) may include the identification associated with the network entity 612 in the provisioning request transmitted to the target service 610, and the target service 610 may include the identification associated with the network entity 612 in the certificate signing request that the target service 610 transmits to the CA service 622.

The CA service may include the public key and/or the identification associated with the network entity 612 in the digital certificate issued to the network entity 612 by the CA. The CA service 622 may transmit the digital certificate to the target service 610, and the target service 610 may transmit the digital certificate to the network entity 612 (or the resource access agent 614). The network entity 612 may retain the digital certificate, and the private key generated by the key generation service 624b associated with the network entity 612, for use in credential requests that the network entity 612 (or the resource access agent 614) submit to the target service 610.

As shown in FIG. 6, the resource consumer infrastructure 604 may include at least one asymmetric key pair 626. The asymmetric key pair 626 may include a private key 628 and a public key 630. The private key 628 may be stored in a storage medium associated with the resource consumer infrastructure 604. The public key 630 may be stored in the storage medium associated with the resource consumer infrastructure 604 and/or the public key 630 may be contained in the digital certificate issued to the network entity 612.

When the asymmetric key pair is generated by the target service 610 or by the key generation service 624a associated with the target service 610, the asymmetric key pair, including the public key and the private key, is unretained by both the target service 610 and the key generation service 624a. For example, the target service 610 and/or the key generation service 624a may delete the asymmetric key pair, including both the private key and the public key. The asymmetric key pair may be deleted upon having transmitted to the network entity 612, the private key and the digital certificate that includes the public key.

When the asymmetric key pair is generated by the network entity 612 or a key generation service 624b associated with the network entity 612, the public key transmitted to the target service 610 in the provisioning request is unretained by the target service 610. For example, the target service 610 may delete the public key upon having transmitted the digital certificate that includes the public key to the network entity 612.

As shown in FIG. 6, the resource consumer infrastructure 604 may include at least one digital certificate 632 associated with a network entity 612. In one example, the resource consumer infrastructure 604 may include at least one digital certificate 632 associated with each of a plurality of network entities 612. Additionally, or in the alternative, the resource consumer infrastructure 604 may include at least one digital certificate 632 associated with a particular network entity 612 for each of a plurality of target services 610 from which the network entity 612 may obtain an access credential. Each digital certificate 632 may include session state information 634. The session state information 634 may include a public key 630 corresponding to a private key 628 associated with the network entity 612. Additionally, or in the alternative, the session state information 634 may include an identification associated with the network entity 612. The identification associated with the network entity may include at least one of: a host ID, a compartment ID, or a tenant ID.

In one example, a provisioning request transmitted by a network entity 612 (or by a resource access agent 614) to a target service 610a may include an authorization credential. The authorization credential may be utilized by the target service to determine whether the network entity 612 (or by a resource access agent 614) is authorized to submit a provisioning request.

In one example, the resource consumer infrastructure 604 may include a user identification module 636. The user identification module may generate a user token 638. The user token 638 may identify a user associated with the network entity 612. The user may be an operator that has logged into the resource consumer infrastructure 604 to submit a provisioning request. The user token 638 may be utilized as an authorization credential for determining that a provisioning request for a network entity 612 is authorized. The user token 638 may be transmitted to the target service 610 in connection with a provisioning request so that the target service 610 may validate the provision request based on the user token 638. In addition, or in the alternative, the network entity 612 may provide a different form of authorization credential that may be utilized to determine whether the provisioning request is authorized. For example, the authorization credential may include a digital signature generated by a private key associated with the network entity 612.

In one example, the cloud provider infrastructure may include an identity access management system 640. The identity access management system 640 may include permissions associated with various network entities 612 and/or users. In one example, a determination as to whether a user identified by a user token 638 is authorized to submit a provisioning request may be determined based on permissions associated with the user and/or the network entity 612 in the identity access management system 640. Additionally, or in the alternative, the identification associated with a network entity 612 included in the session state information of a digital certificate may be compared to information in the identity access management system 640.

Referring further to FIG. 6. The system 600 may include a plurality of network entities 612 located throughout a resource consumer infrastructure 604. A network entity 612 may reside on a substrate network, an overlay network, or a network interface. A network entity 612 may be implemented in hardware and/or software in association with the resource consumer infrastructure. A network entity may include a node, a host, an agent, a service, a component, an endpoint, or other element. The plurality of network entities 612 may include one or more substrate entities, one or more interface entities, and/or one or more overlay entities.

As used herein, the term "substrate entity" refers to a network entity 612 implemented in a substrate network. As used herein, the term "substrate network" refers to a physical network infrastructure. The substrate network generally provides a foundation of a virtual cloud network. The substrate network may include physical network devices, such as routers, switches, network links, and other networking components. The substrate network may generally provide the basic connectivity and transport capabilities necessary for data transmission within and between data centers.

The one or more substrate entities may include substrate hosts, routers, firewall appliances, load balancers, storage devices, and/or substrate services. A substrate host may include an endpoint within the substrate network, such as a bare metal host, a virtual machine, a container, or a physical server. A substrate service may include a service executing or executable on a substrate entity, such as a firmware service, a network connectivity service, an addressing service, a name resolution service, a security service, a network monitoring service, a load balancing service, and/or a storage service. A firmware service may be associated with functionality or management of network infrastructure components or services, such as network devices, boot-up or initialization process, hardware controls, feature enablement, updates, hardware abstraction, network configuration, and/or network management. In one example, a substrate entity may include a combination of hardware and software. In one example, the one or more substrate entities may include one or more substrate hosts, and/or one or more substrate services. In one example, a substrate host may include a bare metal host. In one example, a substrate service may include a firmware service. The substrate entities may communicate with one another, and/or with other network entities 612, using logical network addresses assigned within the overlay network.

As used herein, the term "network interface" refers to a communication interface between a substrate network and an overlay network, such as a network interface card, a smartNIC, or the like. A network interface may include one or more interface entities, such as a node on the network interface, or an interface service executing or executable on the network interface. A node on the network interface may include a programmable hardware component, a memory component, or a gateway component. In one example, a network interface may include a network interface card, such as a smartNIC. Additionally, or in the alternative, a network interface may include a node or an endpoint on a network interface card or smartNIC.

A gateway component may provide connectivity between the substrate network and the network interface, and/or between the network interface and the overlay network. For example, a gateway component may enable communication between overlay entities and substrate entities. Additionally, or in the alternative, a gateway component may provide connectivity between the overlay network and external networks, such as the internet or other networks outside the overlay network. For example, an overlay gateway may enable communication between overlay entities and external endpoints.

As used herein, the term "overlay network" refers to a virtual network built on a substrate network using software-defined networking (SDN), virtualization, tunneling, and/or encapsulation technologies. An overlay network generally operates independently of the underlying substrate network. An overlay network may provide logical separation and isolation of traffic, enable virtual network provisioning, and/or allow for implementation of various network services and policies. Virtual machines, hosts, containers, or virtual network functions running on a substrate network may be connected via an overlay network.

As used herein, the term "overlay entity" refers to a network entity implemented on an overlay network. The overlay network may include a plurality of overlay entities. The plurality of overlay entities may include overlay hosts, overlay services, subnets, overlay controllers, and/or overlay clients. In one example, the overlay network may include a plurality of overlay entities. In one example, an overlay entity may include an overlay host. Additionally, or in the alternative, an overlay entity may include an overlay service. The plurality of overlay entities may communicate with one another using logical network addresses assigned within the overlay network.

An overlay host may include an endpoint within the overlay network, such as a virtual machine, a container, or a physical server. An overlay service may include a service executing or executable on an overlay entity. An overlay service may include a client-specific service, such as a service installed by a client. Additionally, or in the alternative, an overlay service may include a virtual network creation service, a virtual network management service, a virtual machine orchestration service, a container orchestration service, a network virtualization service, an overlay security service, a load balancing service, a multi-tenancy service, and/or a tenant isolation service.

A subnet may include a virtual network segment that has a distinct addressing scheme and/or a distinct set of network policies and/or services. A subnet may include a set of overlay hosts. Multiple subnets may be utilized to partition respective sets of overlay hosts. An overlay controller may oversee management, control, provisioning, configuration, and/or monitoring of an overlay network, network entities on the overlay network, and/or network policies within the overlay. An overlay controller interact with the underlying substrate network, for example, to coordinate the operation of overlay hosts and/or communications across virtual switches and tunnels. An overlay client may include an endpoint or device that initiates communication within the overlay network. An overlay client may be a specific instance or role within an overlay host. An overlay host may include a set of overlay clients. An overlay client may include a consumer or user of services provided by overlay hosts or the IaaS. An overlay client may request and consume resources or services from overlay hosts, acting as consumers or clients of those resources or services.

The resource consumer infrastructure 604 may include one or more data repositories. The one or more data repositories may include a certificate repository. One or more digital certificates 632 may be stored in the certificate repository. Additionally, or in the alternative, the one or more data repositories may include a key repository. One or more asymmetric key pairs 626 may be stored in the key repository. Additionally, or in the alternative, one or more private keys 628 and/or one or more public keys 630 may be stored in the key repository. Additionally, or in the alternative, the one or more data repositories may store identification information associated with the network entities. Each of the one or more data repositories may include any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. The one or more data repositories may share one or more storage units with one another. Additionally, or in the alternative, the or more data repositories may include one or more storage units that differ from one another. Further, the or more data repositories may be implemented or executed on the same computing system as a resource consumer infrastructure 604. Additionally, or in the alternative, one or more of the data repositories may be implemented or executed on a computing system separate from as a resource consumer infrastructure 604. The one or more data repositories may be communicatively coupled to a resource consumer infrastructure 604 via a direct connection or via a network.

In one or more embodiments, the system 600 may include more or fewer components than the components illustrated in FIG. 6. The components illustrated in FIG. 6 may be local to or remote from each other. The components illustrated in FIG. 6 may include software and/or hardware components. Each component may be distributed over multiple applications and/or machines. Multiple components may be combined into one application and/or machine. Operations described with respect to one component may instead be performed by another component. Additional embodiments and/or examples relating to the system 600 are described above in Section 2, titled "Cloud Computing Technology".

In an embodiment, the system 600 may include various components implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

6. Provisioning Network Entities with Access Credentials

Referring now to FIGS. 7A-7E, operations 700 operations pertaining to provisioning a network entity with an access credential for accessing a cloud resource are further described. One or more operations 700 described with reference to in FIGS. 7A-7E may be modified, combined, rearranged, or omitted all together. Accordingly, the particular sequence of operations 700 described with reference to FIGS. 7A-7E should not be construed as limiting the scope of one or more embodiments. In one example, the operations 700 may include one or more provisioning operations described with reference to FIG. 7B. Additionally, or in the alternative, the operations 700 may include one or more access-authorization operations described with reference to FIG. 7C. Additionally, or in the alternative, the operations 700 may include one or more certificate renewal operations described with reference to FIGS. 7D and 7E.

Figure 7A:
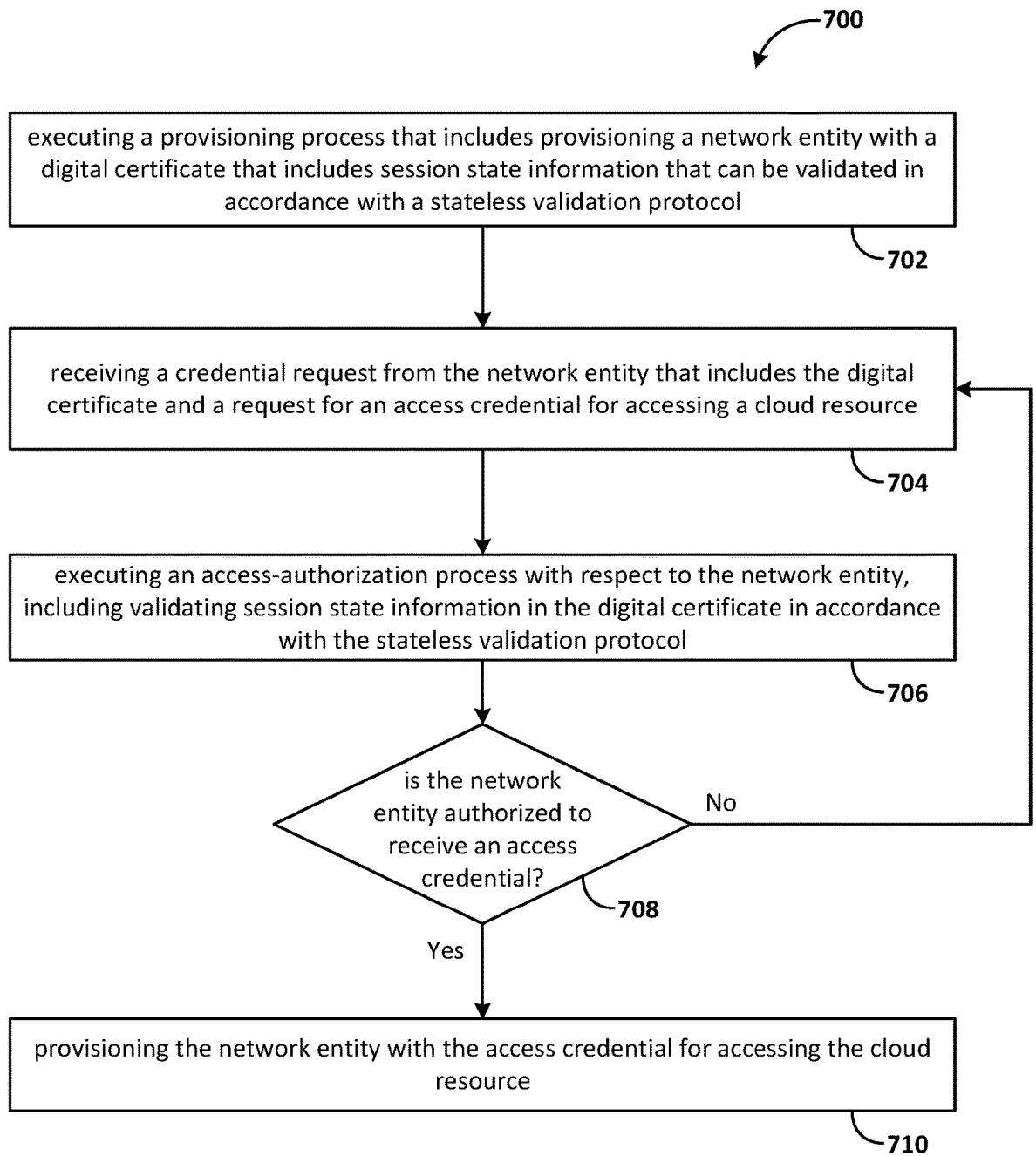
FIGS. 7A-7E are flowcharts that illustrates example operations pertaining to provisioning a network entity with an access credential for accessing a cloud resource in accordance with one or more embodiments.

As shown in FIG. 7A, the operations 700 may include, at block 702, executing a provisioning process that includes provisioning a network entity with a digital certificate that includes session state information that can be authorized based on a stateless validation protocol. The provisioning process may be performed by a target service that controls access to a cloud resource to be accessed by the network entity. The digital certificate may be utilized by the network entity to obtain an access credential for accessing the cloud resource. The target service and the cloud resource may be located on a virtual cloud network. The network entity may also be located on the virtual cloud network. Alternatively, the network entity may be located on a different virtual cloud network that is physically or logically separated from the target service and the cloud resource. In one example, the cloud resource and the target service may be located on a virtual cloud network associated with a service provider, and the network entity may be located on an on-premises network associated with a resource consumer. Additionally, or in the alternative, the target service and the cloud resource may be located on a first virtual cloud network associated with a first service provider, and the network entity may be located on a second virtual cloud network associated with a second service provider. The first virtual cloud network and the second virtual cloud network may represent at least a portion of a multi-cloud environment.

To obtain an access credential for accessing the cloud resource, the network entity may submit a credential request to the target service associated with the cloud resource. As shown in FIG. 7A, the operations 700 may include, at block 704, receiving a credential request from the network entity. The credential request may include the digital certificate and a request for an access credential for accessing the cloud resource associated with the target service. The digital certificate may include session state information for validation in accordance with the stateless validation protocol. In one example, the session state information may include a public key corresponding to the network entity. The public key may be utilized to validate a digital signature generated by the network entity using a private key associated with the network entity. Additionally, or in the alternative, the session state information may include an identification associated with the network entity. The identification associated with the network entity may include at least one of: a host ID, a compartment ID, or a tenant ID.

At block 706, the operations 700 may include executing an access-authorization process with respect to the network entity. The access-authorization process may be executed by the target service responsive to receiving the credential request from the network entity. The access-authorization process may include validating the session state information in the digital certificate in accordance with the stateless validation protocol. At block 708, the operations 700 may include determining whether the network entity is authorized to receive an access credential. When the network entity is authorized to receive an access credential, the operations 700 may include, at block 710, provisioning the network entity with the access credential for accessing the cloud resource. The network entity may then utilize the access credential, directly or indirectly, to access the cloud resource. Alternatively, at block 708, when the network entity is unauthorized, the operations 700 may return to block 704, and a subsequent credential request may be received and processed.

Figure 7B:
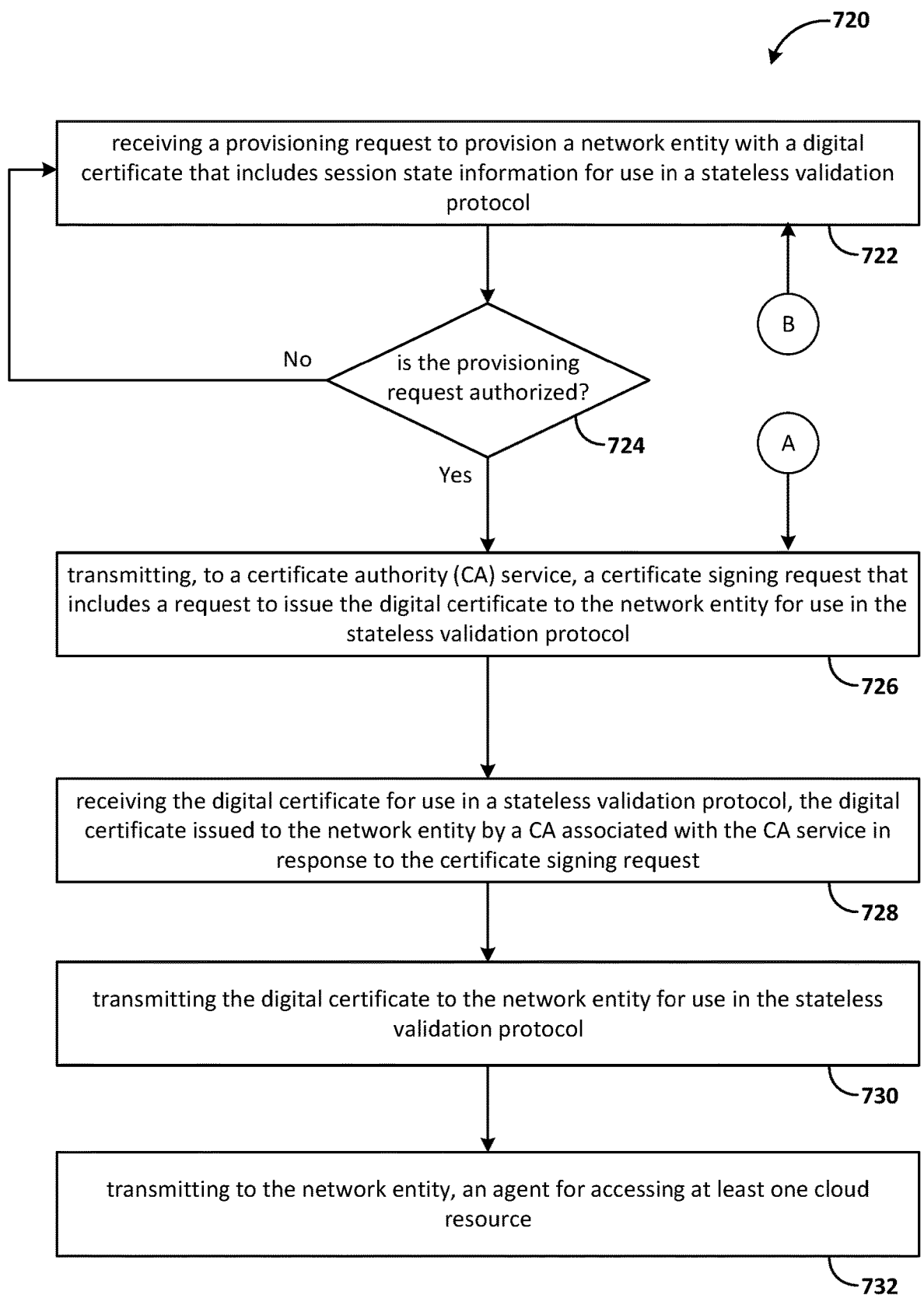

Referring now to FIG. 7B, example provisioning operations 720 are further described. One or more of the provisioning operations 720 described with reference to FIG. 7B may be performed with respect to the provisioning process described with reference to FIG. 7A. In one example, the provisioning operations 720 may include, or may be performed as part of, an instantiation process. The instantiation process may include instantiating the network entity on a virtual cloud network and then performing the provisioning process with respect to the network entity instantiated on the virtual cloud network. In on example, instantiating the network entity may include creating or initializing the network entity, for example, so that it becomes operational and ready to run applications or services. Additionally, or in the alternative, instantiating the network entity may include allocating computing resources (CPU, memory, storage) and configuring the network entity with an operating system and other software components.

As shown in FIG. 7B, at block 722, the provisioning operations 720 may include receiving a provisioning request to provision a network entity with a digital certificate for use in a stateless validation protocol. The provisioning request may be received from the network entity. The provisioning request may be received at a target service that controls access to at least one cloud resource to be accessed by the network entity. The provisioning request may include a request for the target service to provision the network entity with a digital certificate that may be utilized by the network entity to obtain an access credential for accessing the at least one cloud resource. The provisioning request may include an authorization credential that may be utilized to determine whether the provisioning request is authorized. In one example, the provisioning request may include a user token that identifies a user associated with the network entity. The user token may be utilized as the authorization credential.

In one example, the provisioning request may include session state information for use in the stateless validation protocol. In one example, the session state information may include a public key associated with the network entity. Additionally, or in the alternative, the session state information in the provisioning request may include an identification associated with the network entity. The identification associated with the first network entity may include at least one of: a host ID, a compartment ID, or a tenant ID.

The public key may be incorporated into the digital certificate for purposes of validating a digital signature associated with the digital certificate in accordance with the stateless validation protocol. The digital signature may be generated by the network entity using a private key corresponding to the public key. In one example, an asymmetric key pair including the public key and the private key may be generated by the network entity, or by a key generation service associated with the network entity. For example, the network entity may generate the asymmetric key pair. The network entity may retain the private key, and may transmit the public key to the target service in association with the provisioning request. Alternatively, the target service, or a key generation service associated with the target service, may generate an asymmetric key pair that includes a public key and a private key associated with the network entity. In one example, the target service, or the key generation service associated with the target service, may generate the asymmetric key pair responsive to determining that the user identified by the user token is authorized to submit the provisioning request. The target service may incorporate the public key into the digital certificate for use in the stateless validation protocol. Additionally, the target service may transmit the private key to the network entity for the network entity to generate digital signatures that may be validated using the digital certificate in accordance with the stateless validation process.

At block 724, the provisioning operations 720 may include determining whether the provisioning request is authorized. In one example, whether the provisioning request is authorized may be determined based on the authorization credential included in the provisioning request. For example, the provisioning operations 720 may include determining whether a user identified by the user token is authorized to submit the provisioning request. The determination as to whether the user identified by the user token is authorized to submit the first provisioning request may be determined based on permissions associated with the user in an identity access management system. At block 724, responsive to determining that the provisioning request is authorized, and/or that the user identified by the user token is authorized to submit the provisioning request, the provisioning operations 720 may proceed to block 726. Alternatively, if the provisioning request and/or the user is unauthorized, the provisioning operations 720 may return to block 722.

At block 726, the provisioning operations 720 may include transmitting a certificate signing request to a CA service. The certificate signing request may include a request for the CA service to issue a digital certificate to the network entity for use in the stateless validation protocol. The digital certificate may be utilized by the network entity to obtain an access credential for accessing the at least one cloud resource. The certificate signing request may include the session state information to be included in the digital certificate, such as the public key associated with the network entity and/or the identification associated with the network entity. A CA associated with the CA service may issue the digital certificate. The session state information may be incorporated into the digital certificate issued by the CA for purposes of validating the digital certificate in accordance with the stateless validation protocol.

At block 728, the provisioning operations 720 may include receiving the digital certificate for use in the stateless validation protocol. The digital certificate may be issued to the network entity by the CA associated with the CA service in response to the certificate signing request transmitted to the CA service at block 726.

At block 730, the provisioning operations 720 may include transmitting the digital certificate to the network entity for use in the stateless validation protocol. The digital certificate may be transmitted from the target service to the network entity. The digital certificate may include the session state information, such as the public key associated with the network entity and/or the identification associated with the network entity. The network entity may then utilize the digital certificate to obtain an access credential for accessing the at least one cloud resource.

In one example, the network entity may transmit credential requests to the target service that include the digital certificate and a request for an access credential for accessing the at least one cloud resource. The target service may use the session state information included in the digital certificate to validate the credential request in accordance with the stateless validation protocol. In one example, the session state information may include a public key, and the target service may use the public key to validate a digital signature associated with the credential request. In one example, the session state information may include an identification associated with the network entity, and the target service may use the identification associated with the network entity to validate one or more permissions associated with the network entity to determine whether the network entity is authorized to obtain the access credential for accessing the at least one cloud resource.

In one example, at block 732, the provisioning operations 720 may include transmitting to the network entity, an agent for accessing the at least one cloud resource. In one example, the agent may utilize the digital certificate to obtain an access credential to access the at least one cloud resource. In one example, the agent may submit the provisioning request, at block 722, to request the digital certificate for use in the stateless protocol, and the digital certificate issued to the network entity may be utilized by the agent to obtain the access credential.

Figure 7C:
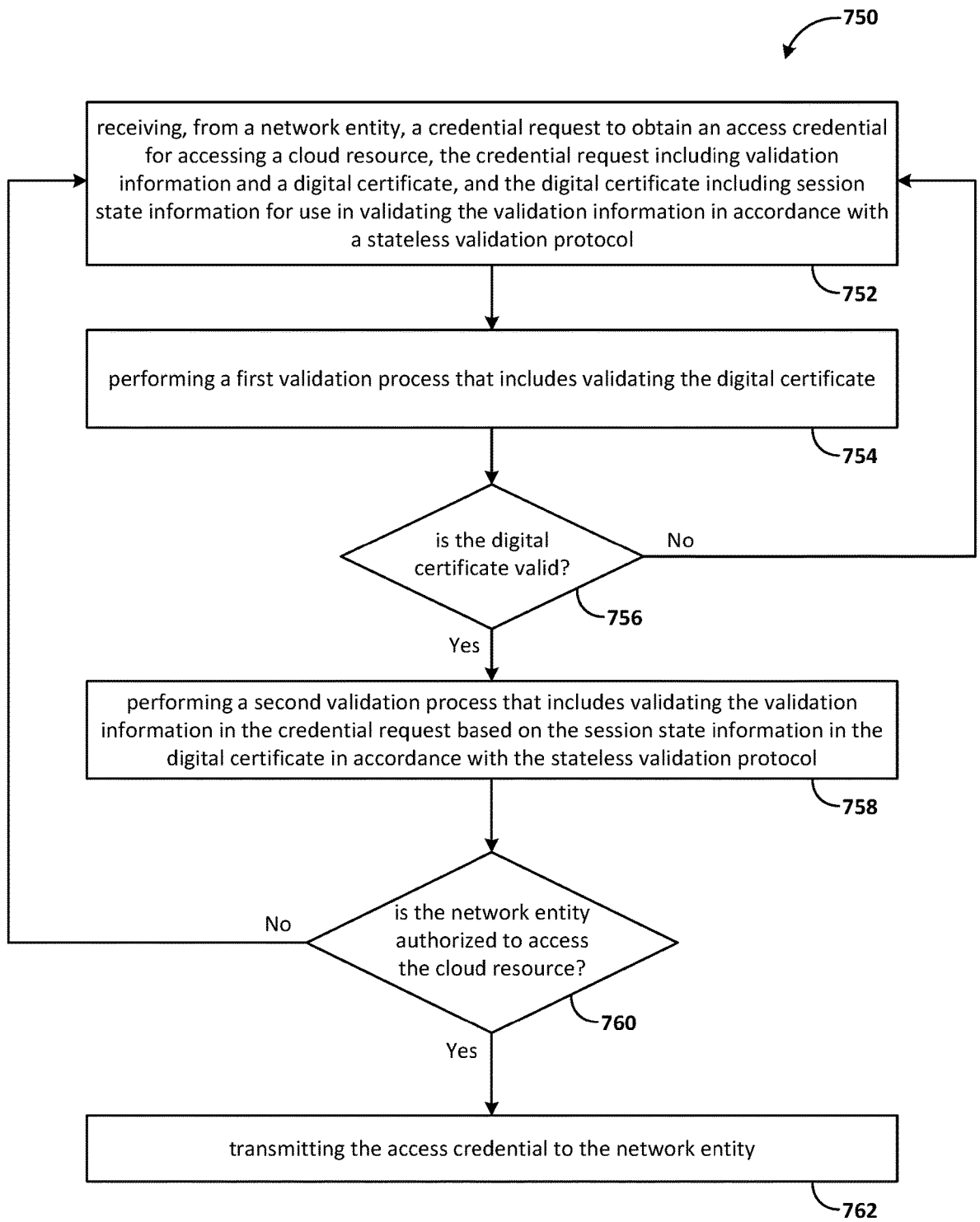

Referring now to FIG. 7C, example access-authorization operations 750 are further described. One or more of the access-authorization operations 750 described with reference to FIG. 7C may be performed with respect to the access-authorization process described with reference to FIG. 7A. As shown in FIG. 7C, at block 752, the access-authorization operations 750 may include receiving a credential request from a network entity. In one example, the credential request may be transmitted from an agent installed on the network entity to a target service that controls access to the cloud resource. The credential request may include a request to obtain an access credential for accessing a cloud resource. The credential request may include validation information and a digital certificate. The digital certificate and/or the credential request may include session state information for use in validating the validation information in accordance with a stateless validation protocol.

At block 754, the access-authorization operations 750 may include performing a first validation process that includes validating the digital certificate. In one example, the digital certificate may include a digital signature generated by a private key corresponding to a CA. The first validation process may include using a public key corresponding to the CA to validate the digital signature included in the digital certificate.

At block 756, the access-authorization operations 750 may include determining, based on the first validation process, whether the digital certificate valid. The digital certificate is determined valid when the digital signature included in the digital certificate corresponds to the CA. The digital signature is determined to correspond to the CA when the public key associated with the CA corresponds to the digital signature. The correspondence of the digital signature included in the digital certificate to the public key associated with the CA indicates that the digital signature was generated by the private key associated with the CA. The CA is trusted, and thus, the digital certificate is trusted based on the digital signature in the CA having been generated by the CA. When the digital signature corresponds to the CA, the digital certificate is determined valid, and the access-authorization operations 750 may proceed to block 758. When the digital signature does not correspond to the CA, the digital certificate is determined invalid, and the access-authorization operations 750 may return to block 752.

At block 758, the access-authorization operations 750 may include performing a second validation process. The second validation process may include validating the validation information in the credential request based on the session state information in the digital certificate. The second validation process may be performed in accordance with the stateless validation protocol. In one example, the session state information may include a public key corresponding to the network entity that submitted the credential request. The public key may be included in the digital certificate. The validation information of the credential request may include a digital signature generated from a private key corresponding to the network entity. The stateless validation protocol may include validating the digital signature in the validation information using the public key from the digital certificate. The digital signature may be determined valid when the public key included in the digital certificate corresponds to the digital signature. Additionally, or in the alternative, the session state information in the digital certificate may include first metadata and the validation information of the certificate request may include second metadata, and the stateless validation protocol may include comparing the first metadata with the second metadata. The validation information may be determined valid when the first metadata corresponds to the second metadata. In one example, the first metadata and the second metadata may include an identification associated with the network entity, such as a host ID, a compartment ID, or a tenant ID. The session state information in the digital certificate, such as the public key and/or the first metadata, is trusted because the digital certificate is issued by a CA that is trusted, as determined in the first validation process.

At block 760, the access-authorization operations 750 may include determining, based on the second validation process, whether the network entity that submitted the credential request is authorized to access the cloud resource corresponding to the credential request. The network entity is determined to be authorized to access the cloud resource when the validation information of the certificate request corresponds to the session state information in the digital certificate. Additionally, or in the alternative, the credential request may be determined to be valid when the validation information of the certificate request corresponds to the session state information in the digital certificate. In one example, the network entity is determined to be authorized to access the cloud resource, and/or the credential request may be determined valid, when the digital signature in the validation information corresponds to the public key from the digital certificate. Additionally, or in the alternative, the network entity is determined to be authorized to access the cloud resource, and/or the credential request may be determined valid, when the first metadata from the digital certificate corresponds to the second metadata in the validation information. When the network entity is determined to be authorized to access the cloud resource, and/or the credential request is determined valid, the access-authorization operations 750 may proceed to block 762. When the network entity is determined to be authorized to access the cloud resource, and/or the credential request is determined invalid, the access-authorization operations 750 may return to block 752.

At block 762, the access-authorization operations 750 may include transmitting the access credential to the network entity. In one example, the access credential may be transmitted from the target service to the agent installed on the network entity. The network entity may then utilize the access credential, directly or indirectly, to access the cloud resource. In one example, the network entity may utilize the agent to access the cloud resource.

In one example, the access credential transmitted to the network entity may be utilized directly to access the cloud resource. The network entity may present the access credential to the cloud resource, and the cloud resource may validate the access credential. Upon determining that the access credential is valid, the cloud resource may grant the network entity access to the cloud resource. In one example the target service may own the cloud resource. In one example, the network entity may be a resource instance provisioned by the target service. The network entity may present the access credential to the target service, and the target service may validate the access credential. Upon determining that the access credential is valid, the target service may grant the network entity access to the cloud resource.

In one example, the access credential may be a first access credential, and the network entity may utilize the first access credential to obtain a second access credential. Upon having obtained the second access credential, the network entity may use the second access credential to access the cloud resource, for example, by presenting the second access credential to the target service or to the cloud resource. In one example, the first access credential may include identity metadata, and the second access credential may be issued to the network entity based on the identity metadata. The identity metadata may include an identity of the target service, and the second access credential may be issued to the network entity based on the identity of the target service.

In one example, the network entity may transmit a request for the second access credential to an identity access management system. The request for the second credential may include the first access credential. The first access credential may include identity information that identifies the target service, and the identity access management system may issue the second access credential to the network entity based on the identity of the target service. The identity access management system may validate the identity of the target service by comparing the identity information in the first access credential to information pertaining to the identity of the target service in the identity access management system. Additionally, or in the alternative, the identity access management system may validate the request for the second access credential based on permissions associated with the target service. The permissions may indicate that the target service owns the cloud resource. Additionally, or in the alternative, the permissions may indicate that the target service is authorized to access the cloud resource. The identity access management system may grant the second access credential to the network entity upon having validated the identity of the target service and/or upon having validated the permissions associated with the target service.

Figure 7D:
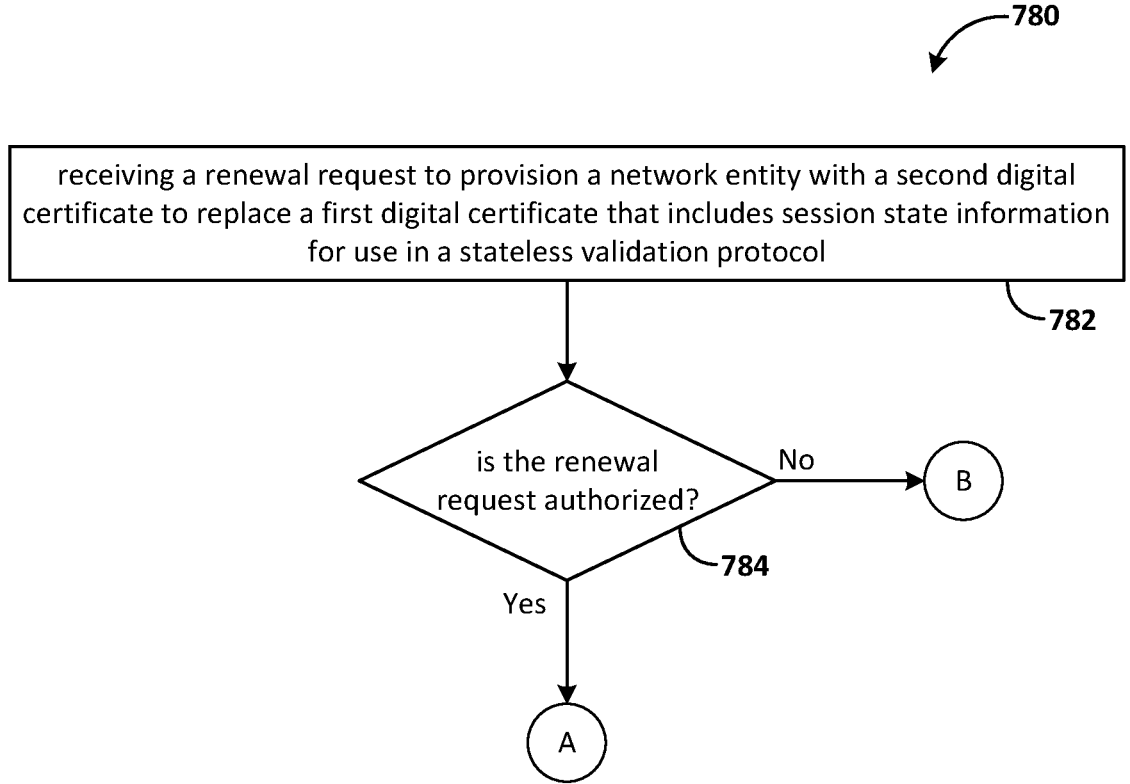
Figure 7E:
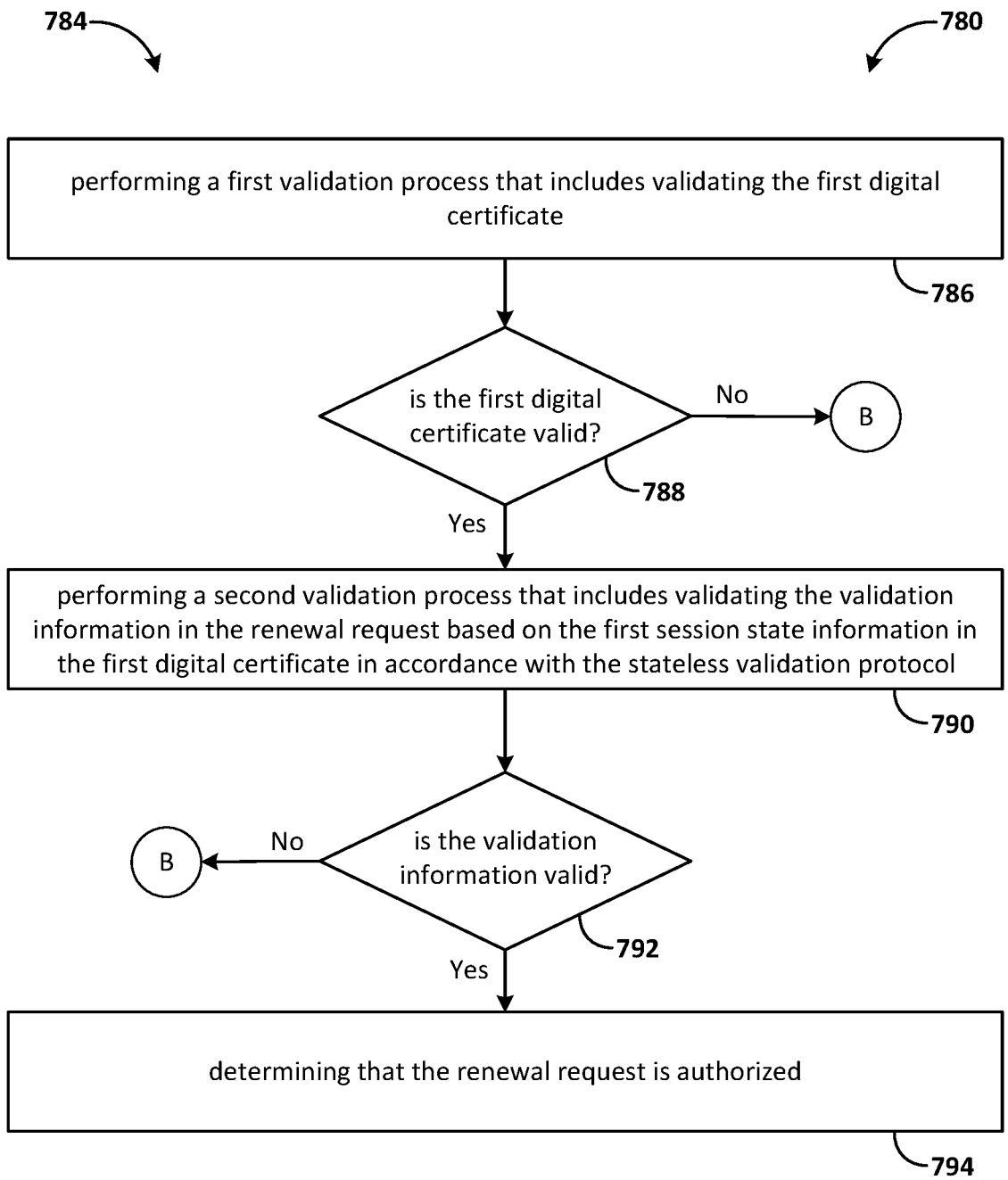

Referring now to FIGS. 7D and 7E, example certificate renewal operations 780 are further described. One or more of the certificate renewal operations 780 described with reference to FIGS. 7D and 7E may be performed with respect to the access-authorization process described with reference to FIG. 7A. In one example, a digital certificate issued to a network entity, for example, in accordance with the provisioning operations 720 described with reference to FIG. 7B, may have an expiry. Additionally, or in the alternative, a public key included in session state information of a digital certificate may have an expiry. The digital certificate may be renewed, for example, prior to the expiry, in accordance with the certificate renewal operations 780 described with reference to FIGS. 7D and 7E. In one example, the digital certificate itself may have an expiry. Additionally, or in the alternative, the public key incorporated into the digital signature may have an expiry. Additionally, or in the alternative, the private key associated with the key incorporated into the digital signature may have an expiry.

As shown in FIG. 7D, at block 782, the certificate renewal operations 780 may include receiving a renewal request to provision a network entity with a second digital to replace a first digital certificate. The renewal request may include the first digital certificate. The first digital certificate may include first session state information for use in a stateless validation protocol. The renewal request may be received from the network entity. The renewal request may be received at a target service that controls access to at least one cloud resource to be accessed by the network entity. The renewal request may include a request for the target service to provision the network entity with a second digital certificate that may be utilized by the network entity to obtain an access credential for accessing the at least one cloud resource, for example, in accordance with the stateless validation protocol.

At block 784, the certificate renewal operations 780 may include determining whether the renewal request is authorized. In one example, whether the renewal request is authorized may be determined based on the first session state information included in the first digital certificate. At block 784, responsive to determining that the renewal request is authorized, the certificate renewal operations 780 may proceed to block 726 (FIG. 7B), where the certificate renewal operations 780 may continue with the provisioning operations 720 described with reference to blocks 726-730 of FIG. 7B. Alternatively, if the renewal request is unauthorized, the certificate renewal operations 780 may proceed to block 724 (FIG. 7B), where provisioning operations may commence with a provisioning request, rather than a renewal request, as described with respect to FIG. 7B.

In one example, in addition to the first session state information included in the first digital certificate, the renewal request may include second session state information to be associated with the second digital certificate issued in response to the renewal request. The second session state information may include a second public key to be transmitted to the CA service in connection with the certificate signing request and to be incorporated into the second digital certificate issued by the CA. The second public key may correspond to a second asymmetric key pair. The second asymmetric key pair may be generated by the network entity or a key generation service associated with the network entity. Additionally, or in the alternative, the second asymmetric key pair may be generated by the target service or a key generation service associated with the target service. In one example, a first asymmetric key pair that includes a first public key corresponding to the session state information of the first digital certificate may have an expiry, and the second asymmetric key pair may be generated in order to obtain a new digital certificate that includes the corresponding second public key to continue utilizing the stateless validation protocol after the expiry of the first asymmetric key pair. In one example, the first asymmetric key pair may be generated at a first key generation date, and the second asymmetric key pair may be generated a second key generation date, and the first key generation date may be prior to the second key generation date.

Referring now to FIG. 7E, the determination as to whether the renewal request is authorized (block 784 of FIG. 7D) is further described. In one example, the determination as to whether the renewal request is authorized (block 784 of FIG. 7D) may include the certificate renewal operations 780 described with reference to FIG. 7E. In one example, the renewal request may include validation information, and the first digital certificate that includes the first session state information. As described with respect to FIG. 7E, the determination as to whether the renewal request is authorized may include using the first session state information in the first digital certificate to validate the validation information in accordance with a stateless validation protocol.

At block 786, the certificate renewal operations 780 may include performing a first validation process that includes validating the first digital certificate. In one example, the first digital certificate may include a digital signature generated by a private key associated with a CA. The first validation process may include using a public key associated with the CA to validate the digital signature included in the digital certificate.

At block 788, the certificate renewal operations 780 may include determining, based on the first validation process, whether the first digital certificate valid. The first digital certificate is determined valid when the digital signature included in the first digital certificate corresponds to the public key associated with the CA. The correspondence of the digital signature included in the first digital certificate to the public key associated with the CA indicates that the digital signature was generated by the private key associated with the CA. The CA is trusted, and thus, the first digital certificate is trusted based on the digital signature in the CA having been generated by the CA. When the first digital certificate is determined valid, the certificate renewal operations 780 may proceed to block 790. When the first digital certificate is determined invalid, the certificate renewal operations 780 may proceed to block 724 (FIG. 7B), where provisioning operations may commence with a provisioning request, rather than a renewal request, as described with respect to FIG. 7B. In one example, the first digital certificate may be determined invalid if the first digital certificate has expired.

At block 790, the certificate renewal operations 780 may include performing a second validation process. The second validation process may include validating the validation information in the renewal request based on the first session state information in the first digital certificate. The second validation process may be performed in accordance with the stateless validation protocol. In one example, the first session state information may include a public key. The public key may be included in the first digital certificate. The validation information of the renewal request may include a digital signature, and the stateless validation protocol may include validating the digital signature in the validation information using the public key from the first digital certificate. The digital signature may be determined valid when the public key included in the first digital certificate corresponds to the digital signature. Additionally, or in the alternative, the first session state information in the first digital certificate may include first metadata and the validation information of the renewal request may include second metadata, and the stateless validation protocol may include comparing the first metadata with the second metadata. The validation information may be determined valid when the first metadata corresponds to the second metadata. In one example, the first metadata and the second metadata may include an identification associated with the network entity, such as a host ID, a compartment ID, or a tenant ID. The first session state information in the first digital certificate, such as the public key and/or the first metadata, is trusted because the first digital certificate is issued by a CA that is trusted, as determined in the first validation process.

At block 792, the certificate renewal operations 780 may include determining, based on the second validation process, whether the validation information is valid. The validation information is determined valid when the validation information of the renewal request corresponds to the first session state information in the first digital certificate. In one example, the validation information may be determined valid when the digital signature in the validation information corresponds to the public key from the first digital certificate. Additionally, or in the alternative, the validation information may be determined valid when the first metadata from the first digital certificate corresponds to the second metadata in the validation information. When the validation information is determined valid, the certificate renewal operations 780 may proceed to block 794. When the validation information is determined invalid, the certificate renewal operations 780 may proceed to block 724 (FIG. 7B), where provisioning operations may commence with a provisioning request, rather than a renewal request, as described with respect to FIG. 7B. In one example, the validation information may be determined invalid if the public key in the first digital certificate has expired.

At block 794, the certificate renewal operations 780 may include determining that the renewal request is authorized, as described with respect to block 784 of FIG. 7D. As a result of the certificate renewal operations 780, a second digital certificate may be transmitted to the network entity for use in the stateless validation protocol, as described with reference to block 730 of FIG. 7A. The network entity may then proceed to utilize the second digital certificate to obtain an access credential for accessing the at least one cloud resource. In one example, the target service may utilize the second session state information in the second digital certificate, such as a public key and/or an identification associated with the network entity, to validate at least one credential request for the target service to issue an access credential to the network entity for accessing the at least one cloud resource. In one example, the target service may utilize the second session state information in the second digital certificate to validate the at least one credential request subsequent to an expiry date of the first digital certificate and/or the first asymmetric key pair corresponding to the first public key in the first digital certificate.

7. Miscellaneous; Extensions

Embodiments are directed to a system with one or more devices that include a hardware processor and that are configured to perform any of the operations described herein and/or recited in any of the claims below. Embodiments are directed to a system including means to perform any of the operations described herein and/or recited in any of the claims below. In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

All references, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer-readable media storing instructions, which when executed by one or more hardware processors, cause performance of operations comprising:
   receiving, from a first network entity, a first credential request and a first digital certificate,
      wherein the first credential request comprises a first digital signature generated from a first private key corresponding to the first network entity, and
      wherein the first digital certificate comprises a first public key corresponding to the first network entity, and a second digital signature generated from a second private key corresponding to a certificate authority (CA);
   performing a first validation of the second digital signature using a second public key corresponding to the CA;
   determining, based on the first validation, that the second digital signature corresponds to the CA;
   determining, based on the second digital signature corresponding to the CA, that the first digital certificate is valid;
   responsive to determining that the first digital certificate is valid, obtaining the first public key from the first digital certificate and performing a second validation of the first credential request using the first public key;
   determining, based on the second validation, that the first digital signature corresponds to the first public key;
   determining, based on the first digital signature corresponding to the first public key, that the first network entity is authorized to access a cloud resource corresponding to the first credential request;
   responsive to determining that the first network entity is authorized to access the cloud resource, transmitting a first access credential to the first network entity,
      wherein the first network entity uses the first access credential, directly or indirectly, to access the cloud resource.

2. The media of claim 1, wherein the operations are performed in accordance with a stateless validation protocol, and wherein at least one of the first credential request or the first digital certificate comprises session state information, wherein the session state information is utilized to perform the operations in accordance with the stateless validation protocol.

3. The media of claim 2, wherein the session state information comprises the first public key.

4. The media of claim 2, wherein the session state information comprises an identification associated with the first network entity, the identification associated with the first network entity comprising at least one of: a host ID, a compartment ID, or a tenant ID.

5. The media of claim 1, wherein the first credential request comprises first metadata and the first digital certificate comprises second metadata, and wherein the operations further comprise:
   performing a third validation, wherein the third validation comprises comparing the first metadata with the second metadata;
   determining, based on the third validation, that the first metadata corresponds to the second metadata;
   wherein determining that the first credential request is valid is further based on the first metadata corresponding to the second metadata,
   wherein the first metadata and the second metadata respectively comprise an identification associated with the first network entity.

6. The media of claim 1,
   wherein the cloud resource is located on a virtual cloud network associated with a service provider, and
   wherein the first network entity is located on an on-premises network associated with a resource consumer.

7. The media of claim 1, wherein the cloud resource is located on a first virtual cloud network associated with a first service provider, and wherein the first network entity is located on a second virtual cloud network associated with a second service provider, wherein the first virtual cloud network and the second virtual cloud network represent at least a portion of a multi-cloud environment.

8. The media of claim 1, wherein the first access credential is issued to the first network entity by a target service, wherein the target service owns the cloud resource.

9. The media of claim 8, wherein the first network entity comprises a resource instance provisioned by the target service.

10. The media of claim 8, wherein the first access credential is used by the first network entity to obtain a second access credential, and wherein the first network entity uses the second access credential to access the cloud resource.

11. The media of claim 10, wherein the first access credential comprises identity metadata, wherein the identity metadata comprises an identity of the target service, wherein the second access credential is issued by an identity access management system based on the identity of the target service, and wherein the first network entity is granted access to the cloud resource based on the identity of the target service.

12. The media of claim 8,
   wherein the first public key and the first private key represent a first asymmetric key pair,
   wherein prior to receiving the first credential request:
      the first asymmetric key pair is generated by the target service or by a key generation service associated with the target service, and
      the first digital certificate and the first private key are transmitted to the first network entity.

13. The media of claim 12, wherein the first public key and the first private key are unretained by the target service.

14. The media of claim 8, wherein the target service serves controls access to the cloud resource.

15. The media of claim 1,
   wherein the first public key and the first private key represent a first asymmetric key pair,
   wherein the first asymmetric key pair is generated by the first network entity or by a key generation service associated with the first network entity.

16. The media of claim 1, wherein the operations further comprise:
   receiving, from a second network entity, a second credential request and a second digital certificate,
      wherein the second digital certificate comprises a third public key, and a fourth digital signature generated from a fourth private key, and
      wherein the second credential request comprises a third digital signature generated from a third private key;
   performing a third validation of the fourth digital signature using the second public key;
   determining, based on the third validation, that the fourth digital signature corresponds to the second public key;

determining, based on the fourth digital signature corresponding to the second public key, that the second digital certificate is valid;
responsive to determining that the second digital certificate is valid, obtaining the third public key from the second digital certificate and performing a fourth validation of the second credential request based on the third public key;
determining, based on the fourth validation, that the third digital signature corresponds to the third public key;
determining, based on the third digital signature corresponding to the third public key, that the second credential request is valid;
responsive to determining that the second credential request is valid, transmitting a second access credential to the second network entity,
wherein the second network entity uses the second access credential, directly or indirectly, to access the cloud resource.

17. One or more non-transitory computer-readable media storing instructions, which when executed by one or more hardware processors, cause performance of operations comprising:
receiving, at a target service located on a first virtual cloud network, a first provisioning request from a first network entity,
wherein the target service controls access to at least one cloud resource located on the first virtual cloud network, and
wherein the first provisioning request comprises a first public key associated with the first network entity, and a first user token that identifies a first user associated with the first network entity;
determining, that the first user identified by the first user token is authorized, by an identity access management system of the first virtual cloud network, to submit the first provisioning request;
responsive to determining that the first user identified by the first user token is authorized to submit the first provisioning request:
transmitting to a certificate authority (CA) service associated with the first virtual cloud network, a first certificate signing request,
wherein the first certificate signing request comprises the first public key associated with the first network entity;
receiving, from the CA service, a first digital certificate comprising the first public key associated with the first network entity,
wherein the first digital certificate is issued by a CA associated with the CA service in response to the first certificate signing request;
transmitting the first digital certificate to the first network entity,
wherein the target service uses the first public key of the first digital certificate to validate a first credential request for the target service to issue a first credential to the first network entity for accessing the at least one cloud resource,
wherein the first credential request is received by the target service subsequent to transmitting the first digital certificate to the first network entity.

18. The media of claim 17, wherein the first provisioning request comprises an identification associated with the first network entity, wherein the first certificate signing request comprises the identification associated with the first network entity, and wherein the first digital certificate comprises the identification associated with the first network entity.

19. The media of claim 18, wherein the identification associated with the first network entity comprises at least one of: a host ID, a compartment ID, or a tenant ID.

20. The media of claim 17, wherein the first digital certificate comprises a first expiry date, and wherein the operations further comprise:
transmitting a second digital certificate to the first network entity,
wherein the second digital certificate comprises a second public key associated with the first network entity,
wherein the target service uses the second public key of the second digital certificate to validate at least a second credential request for the target service to issue a second access credential to the first network entity for accessing the at least one cloud resource,
wherein the first public key corresponds to a first private key, and wherein the second public key corresponds to a second private key,
wherein the first public key and the first private key represent a first asymmetric key pair generated at a first key generation date,
wherein the second public key and the second private key represent a second asymmetric key pair generated at a second key generation date,
wherein the first key generation date is prior to the second key generation date,
wherein the second credential request is received by the target service subsequent to the first expiry date.

21. The media of claim 17, wherein the operations further comprise:
receiving, at the target service, a certificate renewal request and the first digital certificate from the first network entity,
wherein the certificate renewal request comprises a first digital signature generated from a first private key,
wherein the certificate renewal request comprises a second public key associated with the first network entity,
performing a first validation of the first digital signature using the first public key;
determining, based on the first validation, that the first digital signature corresponds to the first public key;
determining, based on the first digital signature corresponding to the first public key, that the first digital signature is valid;
responsive to determining that the first digital certificate is valid, transmitting to the CA service, a second certificate signing request,
wherein the second certificate signing request comprises the second public key associated with the first network entity;
receiving, from the CA service, a second digital certificate comprising the second public key associated with the first network entity,
wherein the second digital certificate is issued by the CA in response to the second certificate signing request;
transmitting the second digital certificate to the first network entity,
wherein the target service uses the second public key of the second digital certificate to validate a second credential request for the target service to issue a second access credential to the first network entity for accessing the at least one cloud resource, wherein the second credential request is received by the target service subsequent to transmitting the second digital certificate to the first network entity.

22. The media of claim 21, wherein the first digital certificate comprises a first expiry date, and wherein the certificate renewal request is received at the target service prior to the first expiry date.

23. The media of claim 17,
wherein the first public key corresponds to a first private key, wherein the first public key and the first private key represent a first asymmetric key pair,
wherein the first asymmetric key pair is generated by the first network entity or by a key generation service associated with the first network entity.

24. The media of claim 17, wherein the operations further comprise:
responsive to determining that the first user identified by the first user token is authorized to submit the first provisioning request:
generating a first asymmetric key pair associated with the first network entity, wherein the first asymmetric key pair comprises the first public key and a first private key,
transmitting the first private key to the first network entity.

25. The media of claim 24, wherein the first public key and the first private key are unretained by the target service.

26. The media of claim 17, wherein the first network entity is located on a second virtual cloud network, wherein the second virtual cloud network is physically or logically separated from the first virtual cloud network.

27. The media of claim 17, wherein the operations further comprise:
receiving, at the target service, a second provisioning request from a second network entity,
wherein the second provisioning request comprises a second public key associated with the second network entity, and a second user token that identifies a second user associated with the second network entity;
determining, that the second user identified by the second user token is authorized, by the identity access management system, to submit the second provisioning request;
responsive to determining that the second user identified by the second user token is authorized to submit the second provisioning request:
transmitting to the CA service, a second certificate signing request,
wherein the second certificate signing request comprises the second public key associated with the second network entity;
receiving, from the CA service, a second digital certificate comprising the second public key associated with the second network entity,
wherein the second digital certificate is issued by the CA in response to the second certificate signing request;
transmitting the second digital certificate to the second network entity,
wherein the target service uses the second public key of the second digital certificate to validate a second credential request for the target service to issue a second access credential to the second network entity for accessing the at least one cloud resource,
wherein the second credential request is received by the target service subsequent to transmitting the second digital certificate to the second network entity.

28. One or more non-transitory computer-readable media storing instructions, which when executed by one or more hardware processors, cause performance of operations comprising:
performing, by a target service, a provisioning process for a network entity, wherein the provisioning process comprises:
transmitting to the network entity, an agent for obtaining an access credential to access at least one cloud resource owned by the target service,
wherein the agent for obtaining the access credential is installed at the network entity, and
wherein the target service controls access to the at least one cloud resource;
transmitting to a certificate authority (CA) service, a first certificate signing request,
wherein the first certificate signing request comprises a first public key corresponding to the network entity;
receiving, from the CA service, a first digital certificate comprising the first public key,
wherein the first digital certificate is issued by a CA associated with the CA service in response to the first certificate signing request;
transmitting the first digital certificate to the network entity;
subsequent to performing the provisioning process, performing an access-authorization process for authorizing the agent installed on the network entity to access the at least one cloud resource, wherein the access-authorization process comprises:
receiving, from the agent installed on the network entity, a credential request and the first digital certificate,
wherein the credential request comprises a first digital signature generated from a first private key corresponding to the network entity, and
wherein the first digital certificate further comprises a second digital signature generated from a second private key corresponding to the CA;
performing a first validation of the second digital signature using a second public key corresponding to the CA;
determining, based on the first validation, that the second digital signature corresponds to the CA;
determining, based on the second digital signature corresponding to the CA, that the first digital certificate is valid;
responsive to determining that the first digital certificate is valid, obtaining the first public key from the first digital certificate and performing a second validation of the credential request using the first public key;
determining, based on the second validation, that the first digital signature corresponds to the first public key;
determining, based on the first digital signature corresponding to the first public key, that the network entity is authorized to access the at least one cloud resource;
responsive to determining that the network entity is authorized to access the at least one cloud resource, transmitting the access credential to the agent installed on the network entity, wherein the agent installed on the network entity uses the access credential, directly or indirectly, to access the at least one cloud resource.

29. The media of claim 28, wherein the operations further comprise:
performing an instantiation process, wherein the instantiation process comprises:
instantiating the network entity on a virtual cloud network; and
performing the provisioning process.

* * * * *